US012699840B2

(12) United States Patent
Spannhake, II et al.

(10) Patent No.: US 12,699,840 B2
(45) Date of Patent: Aug. 4, 2026

(54) PARTNER MANAGEMENT RUNTIME ENFORCEMENT

(71) Applicant: Citigroup Inc., New York, NY (US)

(72) Inventors: Ernst Wilhem Spannhake, II, Columbus, OH (US); Hiten Jayantilal Shah, Irving, TX (US); Thomas Francis Gianelle, Irving, TX (US)

(73) Assignee: Citigroup Inc., New York, NY (US)

( * ) Notice: Subject to any disclaimer, the term of this patent is extended or adjusted under 35 U.S.C. 154(b) by 0 days.

(21) Appl. No.: 19/299,234

(22) Filed: Aug. 13, 2025

(65) Prior Publication Data

US 2026/0064968 A1 Mar. 5, 2026

Related U.S. Application Data

(63) Continuation-in-part of application No. 18/976,220, filed on Dec. 10, 2024, which is a continuation of application No. 18/823,584, filed on Sep. 3, 2024, now Pat. No. 12,204,855.

(51) Int. Cl.
| | |
|---|---|
| *G06F 40/279* | (2020.01) |
| *G06Q 20/38* | (2012.01) |

(52) U.S. Cl.
CPC ......... *G06F 40/279* (2020.01); *G06Q 20/389* (2013.01)

(58) Field of Classification Search
CPC .......................... G06F 40/279; G06Q 20/389
USPC ............................................................. 704/9
See application file for complete search history.

(56) References Cited

U.S. PATENT DOCUMENTS

| | | | |
|---|---|---|---|
| 10,719,374 B1 * | 7/2020 | Mathur | ................ G06F 16/252 |
| 2023/0156136 A1 | 5/2023 | Nakano | |
| 2025/0217215 A1 * | 7/2025 | Hursh | .................... G06F 9/547 |

* cited by examiner

*Primary Examiner* — Thierry L Pham

(74) *Attorney, Agent, or Firm* — Davis Wright Tremaine LLP

(57) ABSTRACT

Metadata corresponding to a set of conditions applicable to an exchange to be performed among a plurality of entities is obtained, the set of conditions determined using one or more trained artificial intelligence models. A set of application programming interfaces (APIs) are generated based, at least in part, on the set of conditions. One or more points to insert the set of APIs to an executable application code to be executed for the exchange are determined. The set of APIs to be called during runtime of the executable application code to implement the set of conditions.

20 Claims, 16 Drawing Sheets

Runtime Enforcement System 102

Input Management Subsystem 106

Compute and Storage Engine 108

Runtime Platform Management Subsystem 110

Result Set 116

Event context information 114

104

112

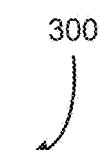
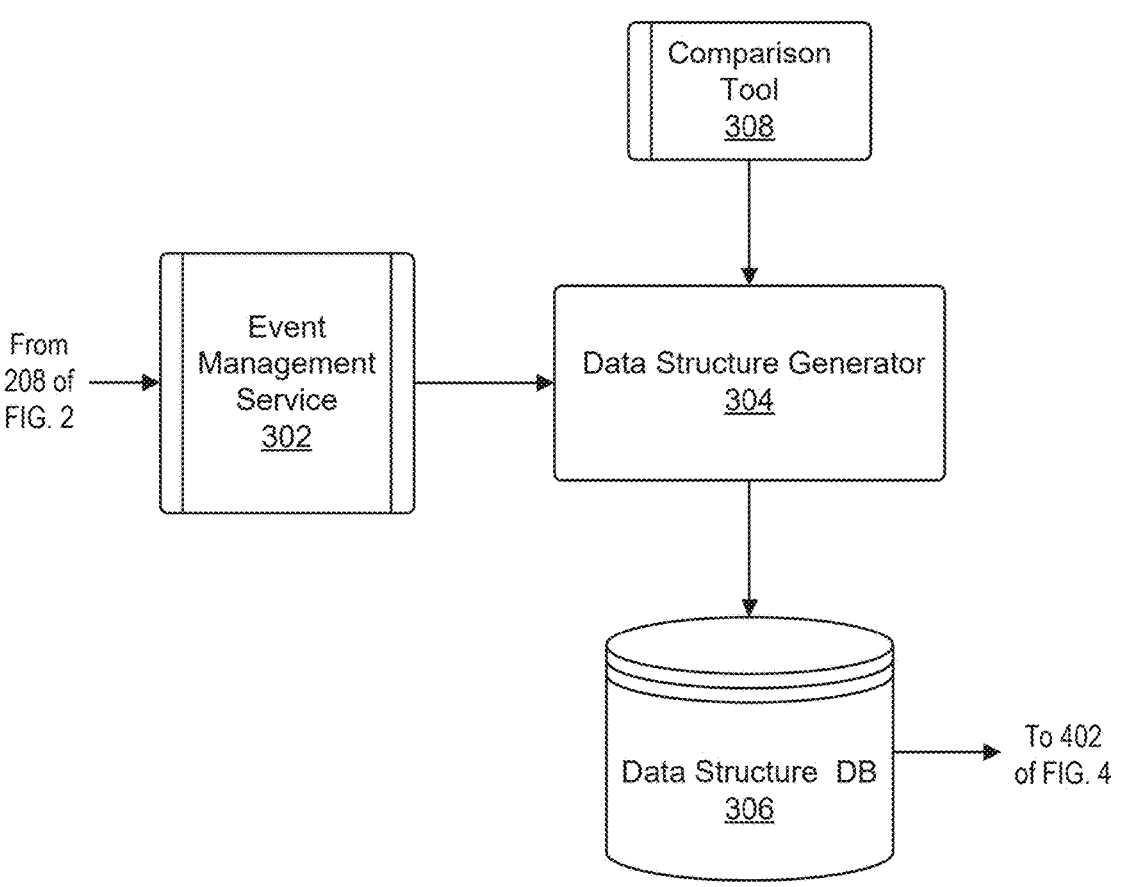
FIG. 3

600
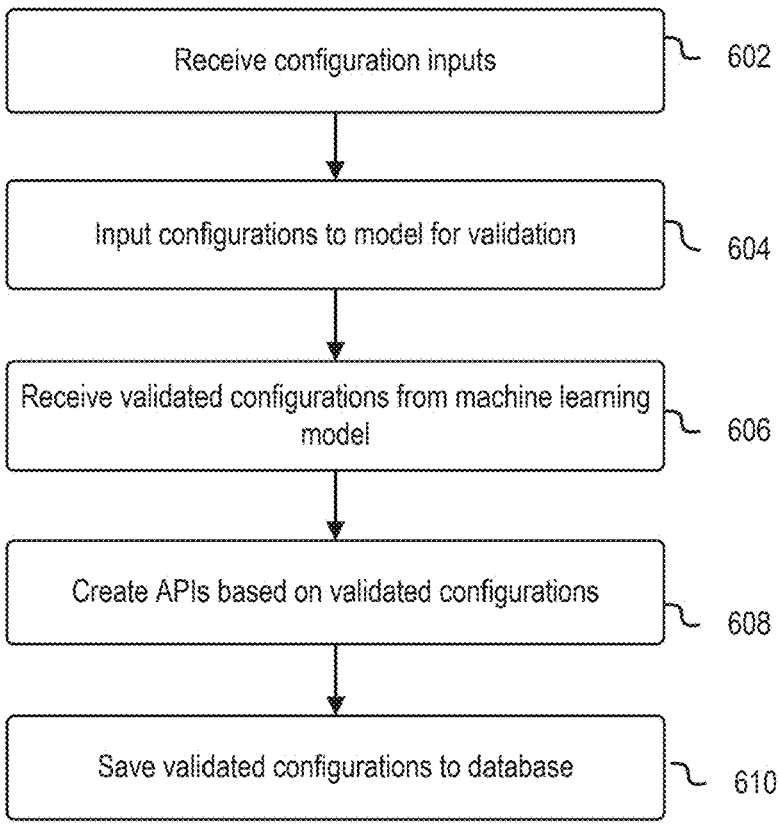
| Receive configuration inputs | 602 |
| Input configurations to model for validation | 604 |
| Receive validated configurations from machine learning model | 606 |
| Create APIs based on validated configurations | 608 |
| Save validated configurations to database | 610 |
FIG. 6

700
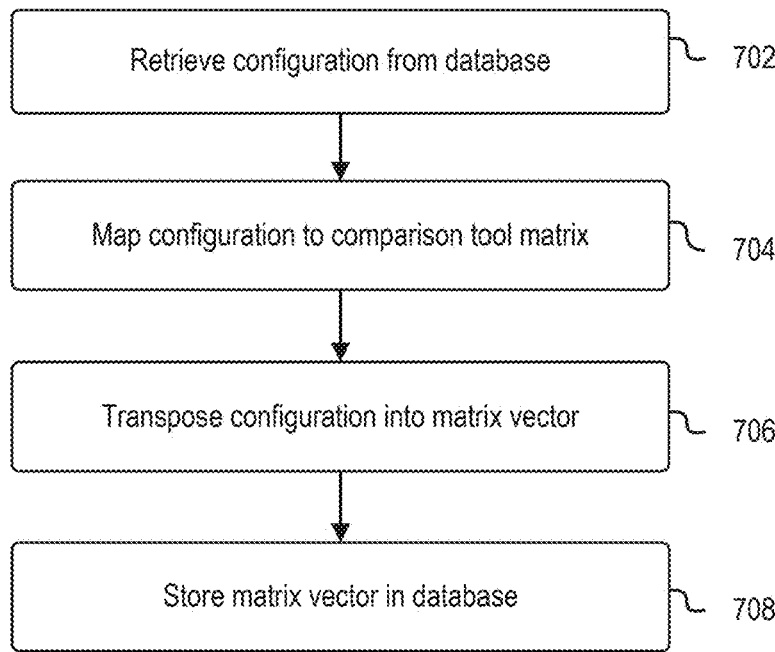
| Retrieve configuration from database | 702 |
| Map configuration to comparison tool matrix | 704 |
| Transpose configuration into matrix vector | 706 |
| Store matrix vector in database | 708 |
FIG. 7

800

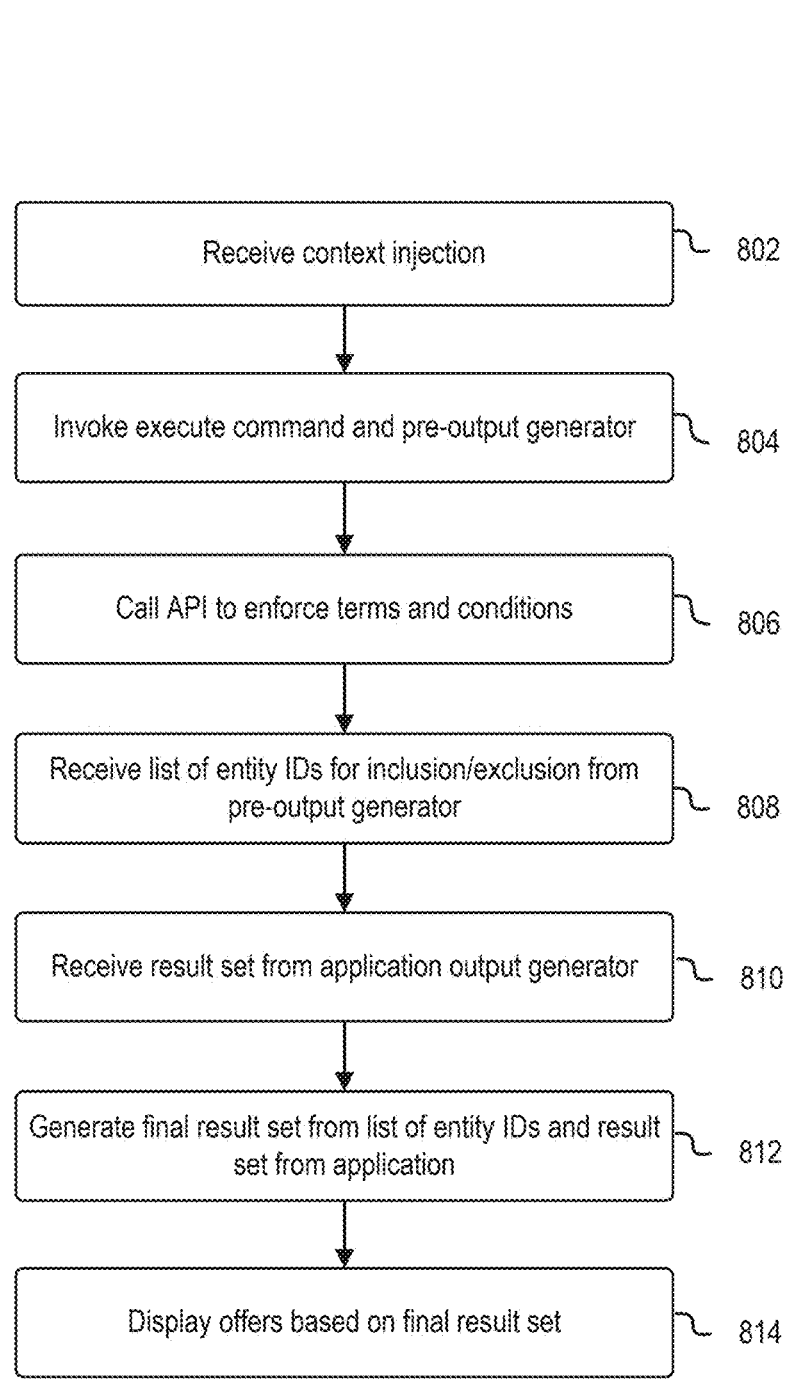

Receive context injection — 802

Invoke execute command and pre-output generator — 804

Call API to enforce terms and conditions — 806

Receive list of entity IDs for inclusion/exclusion from pre-output generator — 808

Receive result set from application output generator — 810

Generate final result set from list of entity IDs and result set from application — 812

Display offers based on final result set — 814

FIG. 8

900
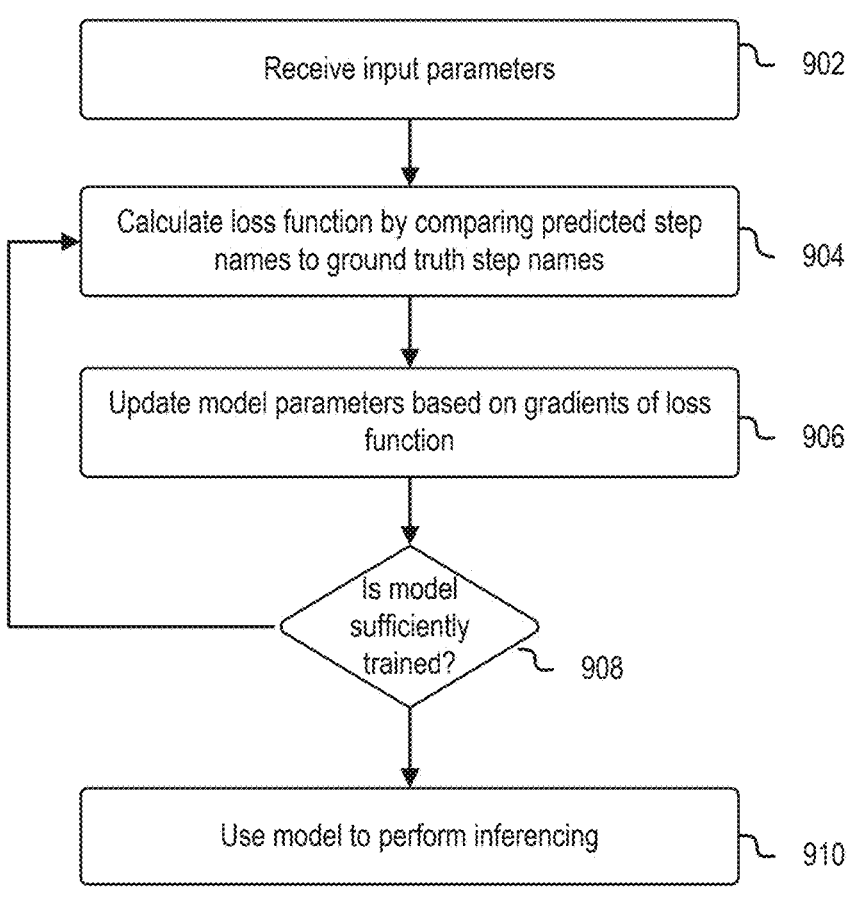
| Receive input parameters | 902 |
Calculate loss function by comparing predicted step names to ground truth step names — 904
Update model parameters based on gradients of loss function — 906
Is model sufficiently trained? — 908
Use model to perform inferencing — 910
FIG. 9

1000

Storage Subsystem
1008

Memory Subsystem
1024
Clock

RAM
1018

ROM
1020

File Storage Subsystem
1010

User Interface Input Devices
1012

Bus Subsystem
1004

Network Interface
1016

User Interface Output Devices
1014

Processor(s)
1002

1006

1100

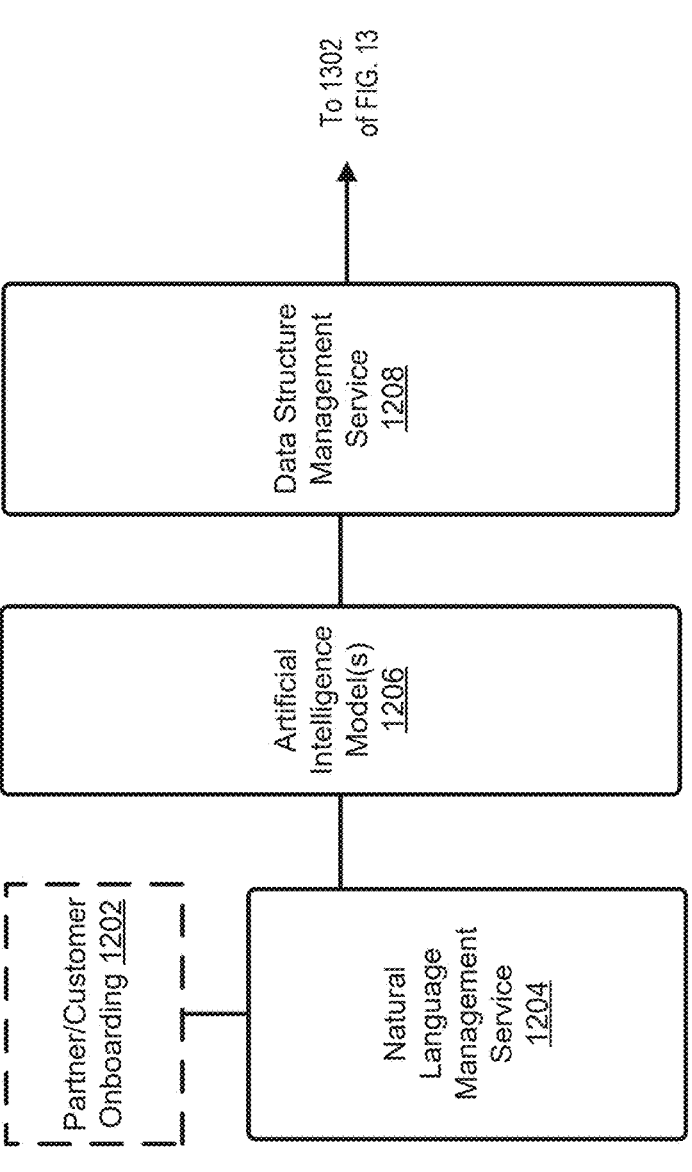
FIG. 12

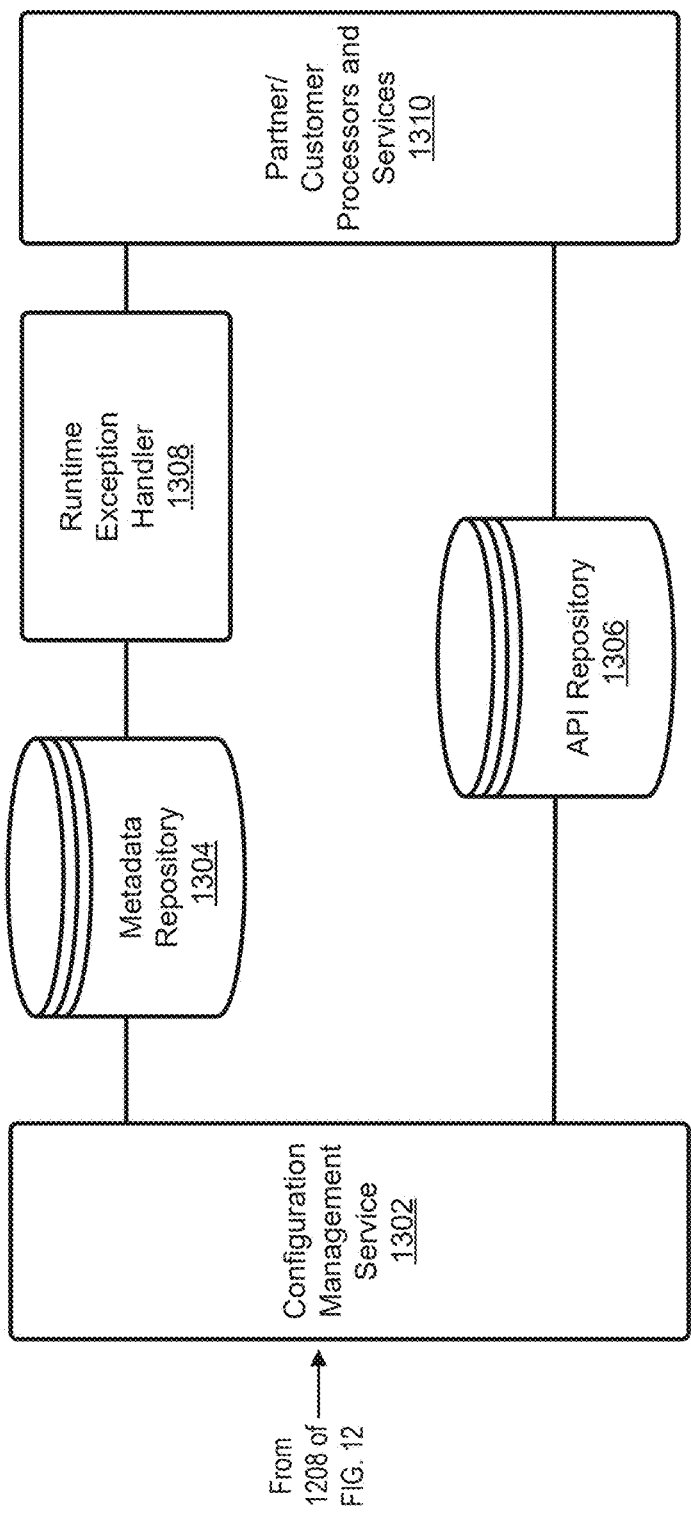
FIG. 13

1500

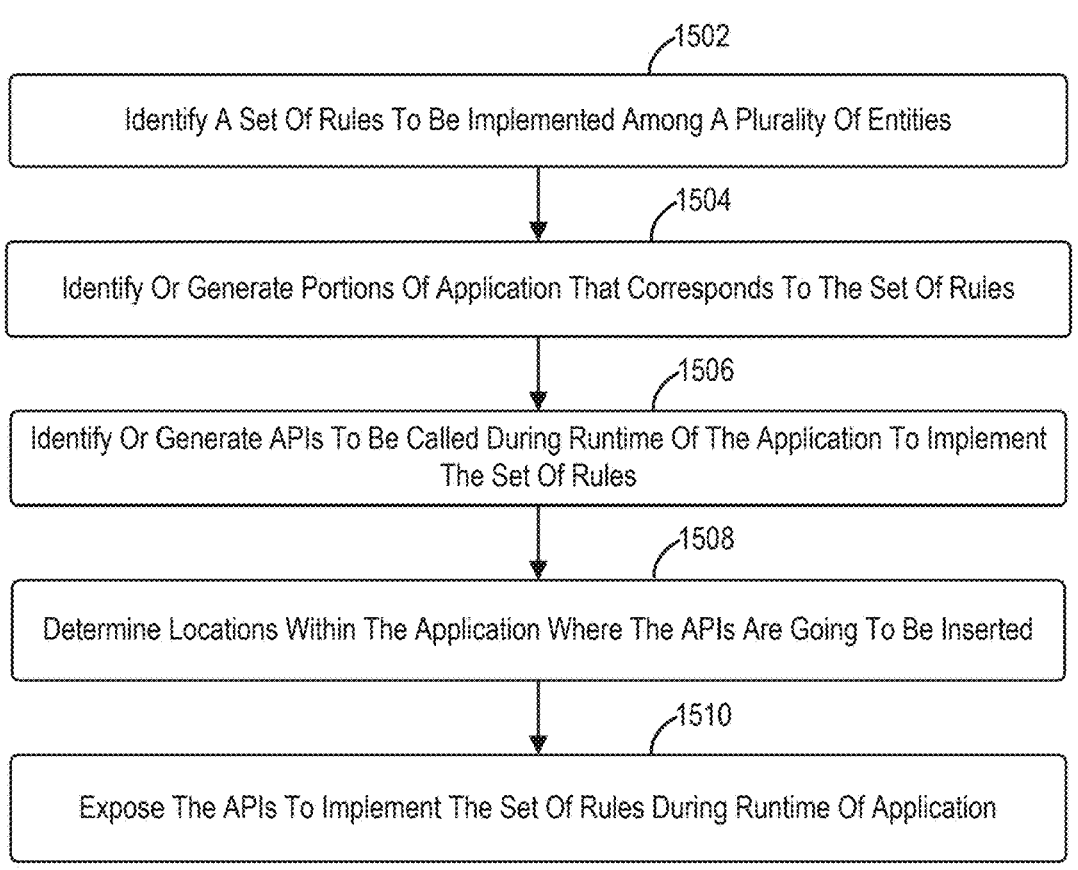

1502

Identify A Set Of Rules To Be Implemented Among A Plurality Of Entities

1504

Identify Or Generate Portions Of Application That Corresponds To The Set Of Rules

1506

Identify Or Generate APIs To Be Called During Runtime Of The Application To Implement The Set Of Rules

1508

Determine Locations Within The Application Where The APIs Are Going To Be Inserted

1510

Expose The APIs To Implement The Set Of Rules During Runtime Of Application

FIG. 15

1600

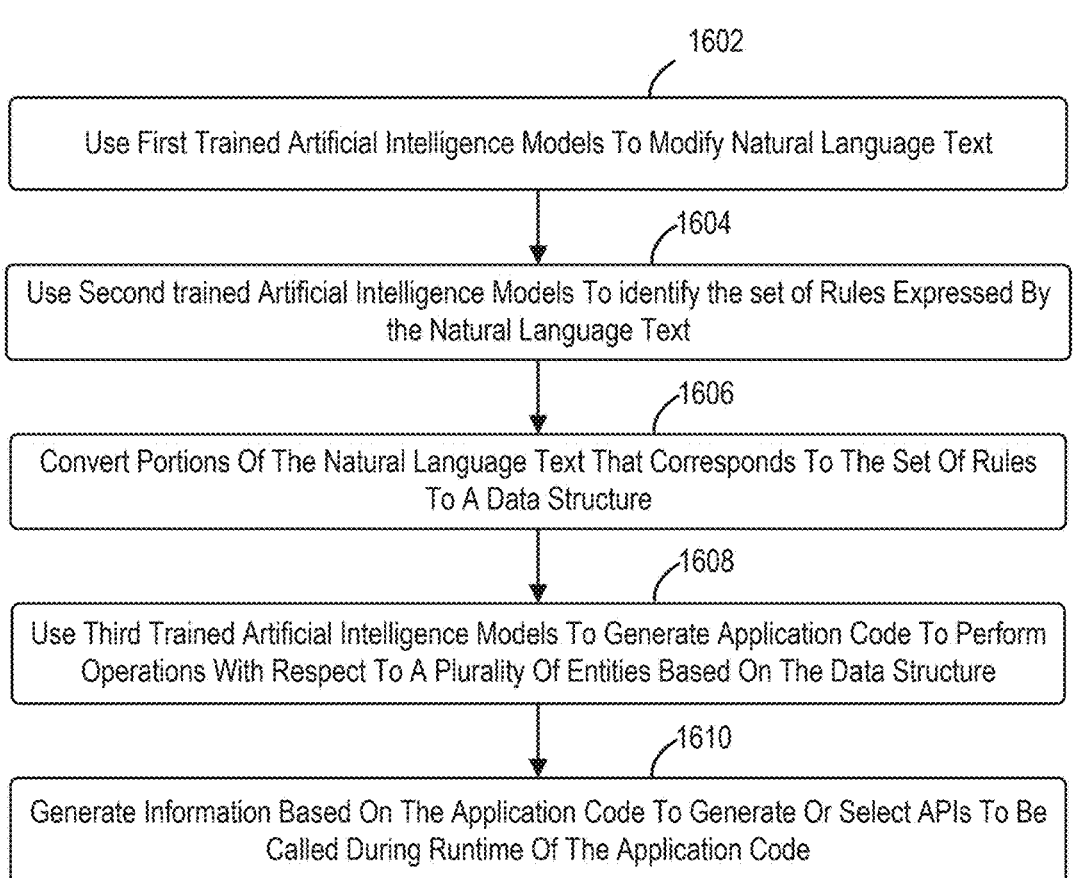

1602

| Use First Trained Artificial Intelligence Models To Modify Natural Language Text |

1604

| Use Second trained Artificial Intelligence Models To identify the set of Rules Expressed By the Natural Language Text |

1606

| Convert Portions Of The Natural Language Text That Corresponds To The Set Of Rules To A Data Structure |

1608

| Use Third Trained Artificial Intelligence Models To Generate Application Code To Perform Operations With Respect To A Plurality Of Entities Based On The Data Structure |

1610

| Generate Information Based On The Application Code To Generate Or Select APIs To Be Called During Runtime Of The Application Code |

FIG. 16

PARTNER MANAGEMENT RUNTIME ENFORCEMENT

CROSS-REFERENCE TO RELATED APPLICATIONS

This application is a continuation-in-part of co-pending U.S. patent application Ser. No. 18/976,220, filed on Dec. 10, 2024, entitled "PARTNER MANAGEMENT RUN-TIME ENFORCEMENT," which is a continuation of U.S. patent application Ser. No. 18/823,584, filed on Sep. 3, 2024, now issued as U.S. Pat. No. 12,204,855, entitled "PART-NER MANAGEMENT RUNTIME ENFORCEMENT," the full disclosures of which are incorporated by reference herein in its entirety. This application also incorporates by reference for all purposes the full disclosure of co-pending U.S. patent application Ser. No. 18/980,792, filed on Dec. 13, 2024, entitled "PARTNER MANAGEMENT RUN-TIME ENFORCEMENT," which is a continuation of U.S. patent application Ser. No. 18/823,584, filed on Sep. 3, 2024, now issued as U.S. Pat. No. 12,204,855, entitled "PART-NER MANAGEMENT RUNTIME ENFORCEMENT,"

BACKGROUND

A set of conditions provided in a document may be used to moderate and validate computer-detected events. Implementation of a set of conditions against the computer-detected events may demand customization of software code or application programming interfaces (APIs) to capture various attributes specific to that set of conditions. Such customization, however, may be time-consuming, labor-intensive, and vulnerable to error.

SUMMARY

One or more computer programs can be configured to perform particular operations or actions by virtue of including instructions that, when executed by data processing apparatus, cause the apparatus to perform the actions. One general aspect may include a computer-implemented method for dynamically generating a set of application programming interfaces APIs usable to implement a set of conditions applicable to an exchange to be performed among a plurality of entities. The computer-implemented method also may include receiving, an indication to generate the set of APIs. The computer-implemented method may also include receiving in response to the indication, metadata corresponding to the set of conditions. The computer-implemented method may also include generating the set of APIs based, at least in part, on the metadata. The computer-implemented method may also include analyzing executable application code to determine one or more insertion points for the set of APIs to be called, the executable application code to be executed during performance of the exchange. The method computer-implemented method may also include inserting the set of APIs into the executable application code using the one or more insertion points to cause the set of conditions to be implemented in real time as a result of calling the set of APIs.

Other embodiments of this aspect include corresponding computer systems, apparatus, and computer programs recorded on one or more computer storage devices, each configured to perform the actions of the computer-implemented methods.

Implementations may include one or more of the following features. The computer-implemented method may include obtaining natural language text modified by at least using one or more trained artificial intelligence models, and identifying portions of natural language text that expresses the set of conditions. The machine-readable data structure is usable to generate the set of APIs. At least one of the executable application code can be generated using one or more trained artificial intelligence models based, at least in part, on one or more matrices that correspond to the set of conditions. Implementations of the described techniques may include hardware, a method or process, or computer software on a computer-accessible medium.

One general aspect may include a system that includes one or more processors. The system also may include one or more non-transitory, computer-readable media may include executable instructions recorded thereon that, as a result of execution by the one or more processors, cause the system to at least obtain metadata corresponding to a set of conditions applicable to an exchange to be performed among a plurality of entities, the set of conditions determined using one or more trained artificial intelligence models, generate a set of APIs based, at least in part, on the set of conditions; determine one or more points to insert the set of APIs to an executable application code to be executed for the exchange; and cause the set of APIs to be called during runtime of the executable application code to implement the set of conditions.

Implementations may include one or more of the following features. The system where the executable instructions may further include instructions that further cause the system to generate, using one or more additional trained artificial intelligence models, a portion of the executable application code based, at least in part, on the set of conditions. The executable instructions may further include instructions that further cause the system to update a specification of the set of APIs as a result of obtaining an indication that the set of conditions has been changed. The executable instructions may further include instructions that further cause the system to obtain context information corresponding to at least one of the plurality of entities and generate machine-readable data structure based, at least in part, on the set of conditions and the context information, where the machine-readable data structure is usable to generate the set of APIs. The machine-readable data structure can be generated by at least converting the set of conditions and the context information into one or more matrices. The one or more points (e.g., locations in the executable application code) to insert the set of APIs and one or more arguments for the set of APIs can be determined based, at least in part, on the machine-readable data structure. The executable instructions may further include instructions that further cause the system to update the one or more trained artificial intelligence models based, at least in part, on natural language text. The executable instructions may further include instructions that further cause the system to determine a format for the set of APIs based, at least in part, on a tech stack that corresponds to the executable application code. Implementations of the described techniques may include hardware, a method or process, or computer software on a computer-accessible medium.

One general aspect includes one or more non-transitory computer-readable storage media may also include instructions to cause a computer system to obtain metadata corresponding to a set of conditions applicable to an exchange to be performed among a plurality of entities, the set of conditions determined using one or more trained artificial intelligence models. The instructions may further cause the computer system to generate a set of application programming interfaces APIs based, at least in part, on the set of conditions. The instructions may further cause the computer system to analyze executable application code to be executed during performance of the exchange to determine one or more locations for the set of APIs to be embedded into the executable application code. The instructions may further cause the computer system to cause the set of APIs to implement the set of conditions for the exchange during execution of the executable application code.

Implementations may include one or more of the following features. Calling the set of APIs to implement the set of conditions may cause an additional set of conditions to control the exchange, the additional set of conditions corresponding to an additional set of APIs. The instructions may further cause the computer system to generate, using one or more additional trained artificial intelligence models, a portion of the executable application code based, at least in part, on the set of conditions. The instructions may further cause the computer system to generate machine-readable data structure based, at least in part, on the set of conditions and context information that corresponds to at least one of the plurality of entities. The instructions may further cause the computer system to determine a set of functions to be performed as a result of calling the set of APIs based, at least in part, on the machine-readable data structure. The one or more locations for the set of APIs to be embedded is determined based, at least in part, on the machine-readable data structure. The instructions may further cause the computer system to determine a format for the set of APIs based, at least in part, on a tech stack that corresponds to the executable application code. The instructions may further cause the computer system to determine dependencies between a first API and a second API of the set of APIs to cause a second API to be called as a result of calling the first API. Implementations of the described techniques may include hardware, a method or process, or computer software on a computer-accessible medium.

BRIEF DESCRIPTION OF THE DRAWINGS

Various techniques will be described with reference to the drawings, in which:

FIG. 3 illustrates an example of a compute and storage engine of the runtime enforcement system of FIG. 1, in accordance with an embodiment;

FIG. 6 illustrates an example of a method for validating and storing configurations input to a runtime enforcement system, in accordance with an embodiment;

FIG. 7 illustrates an example of a method for transforming configurations into computer-readable data structures at a compute and storage engine of a runtime enforcement system, in accordance with an embodiment;

FIG. 8 illustrates an example of a method for validating an event against configurations of an agreement at a runtime platform management subsystem of a runtime enforcement system, in accordance with an embodiment;

FIG. 9 illustrates an example of a method for training one or more machine learning models used in a runtime enforcement system to infer compliance of configurations to prior agreements in accordance with an embodiment;

FIG. 12 illustrates an example of a system for implementing rules by calling application programming interfaces (APIs), in accordance with an embodiment;

FIG. 13 illustrates an example of a system for managing APIs to implement rules indicated by natural language text during runtime of applications;

FIG. 15 illustrates an example of a method for implementing rules by calling APIs, in accordance with an embodiment; and FIG. 16 illustrates an example of a method for managing APIs to implement rules indicated by natural language text during runtime of applications.

DETAILED DESCRIPTION

Figure 1:
FIG. 1 illustrates an example of a runtime enforcement system, in accordance with an embodiment.

The present application describes systems and techniques to manage and/or monitor implementation of a set of conditions provided in a document. In at least one embodiment, the set of conditions may be represented in the document as natural language text. Identifying a set of conditions that may be used to validate events, such as computer-detected events, may require customization of software code to the set of conditions in order to allow a software program to use the set of conditions to monitor the events for compliance (e.g., to the set of conditions). The customization may be demanded because the set of conditions may include attributes (e.g., terms, allowances, etc.) that may be specific to two or more entities or parties associated with the set of conditions. Furthermore, implementing the set of conditions to enforce compliance of events thereto may be a complicated process that relies on retrieval of relevant data from various sources. For example, each document from which a set of condition may be obtained may be stored at a separate location from documents, which may demand large amounts of storage space and cause location and retrieval of a specific set of conditions corresponding to a document to be slow. In addition, verification that an event complies with an associated set of conditions may require extensive, resource-demanding comparison of the event against the set of conditions as well as against other contributing factors, such as historical data and a context of the event. As such, customizing code to facilitate management of sets of conditions may be time-consuming, labor intensive, and error-prone, which may hinder scalability and throughput of software programs used to perform such tasks.

In this disclosure, a set of conditions included in a document is implemented by storing the set of conditions in a manner that allows the set of conditions to be retrieved when an event occurs for which adherence to the set of conditions is desired. In at least one embodiment, a system obtains a document that includes natural language text and extracts a set of conditions expressed by the natural language text of the document. The set of conditions are extracted using a machine learning model trained on other natural language text in the embodiment. Further in the embodiment, a validation process is performed against the set of conditions extracted from the document to result in a validated set of conditions. Then, in the embodiment, upon successful validation, the system generates a machine-readable data structure to indicate one or more conditions of the validated set of conditions expressed within the documents. In at least one embodiment, the machine-readable data structure may be usable to evaluate the validated set of conditions against computer-detected events.

In at least one embodiment, a system obtains a first machine-readable data structure representing a validated set of conditions extracted from a natural language document. Further in the embodiment, the system obtains additional information including event context information associated with a potential future event, data corresponding to a condition imposed on the potential future event; and inclusion and/or exclusion information relating to the conditions. Then, in the embodiment, the system generates a second data structure that indicates how the condition affects the potential future event. In at least one embodiment, the second data structure is generated based at least in part on the first data structure and the additional information.

In at least one embodiment, a system obtains real-time context information relating to one or more attributes associated with an event. In the embodiment, the real-time context information includes an entity identifier associated with an entity. Further in the embodiment, the system obtains a matrix vector that is derived from event context information and a set of conditions for events. The system generates a first result set indicating a subset of the set of conditions applicable to the entity associated with the entity identifier. In the embodiment, the first result set is generated based at least in part on a list of entity identifiers. Then, in the embodiment, the system outputs a second result set derived from the first result set and the matrix vector, where the second result set indicates whether the event conforms to a condition from the set of conditions applicable to the entity.

Techniques described and suggested in the present disclosure improve the field of computing, especially the field of partnership management, by obtaining a set of conditions that are used to validate computer-detected events at runtime. Additionally, techniques described and suggested in the present disclosure improve the efficiency/functioning of servers and computing systems by reducing the amount of storage needed to store multiple sets of conditions and reducing network traffic that would otherwise consume large amounts of network resources. For example, reducing network traffic will result in reduced infrastructure cost. Moreover, techniques described and suggested in the present disclosure are necessarily rooted in computer technology in order to overcome problems specifically arising with the computing resources required to obtaining a set of conditions from a document to generate a validated set of conditions that can be used to evaluated whether an event is compliant with the set of conditions. Further, the techniques of this disclosure overcome these problems by reducing the demand for creating customized code to accommodate management of individual sets of conditions, which reduces an amount of storage needed to store data required to validate and enforce the sets of conditions, reduces the volume of network traffic, and reduces the complexity in monitoring and enforcing individual sets of conditions.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Any system or apparatus feature as described herein may also be provided as a method feature, and vice versa. System and/or apparatus aspects described functionally (including means plus function features) may be expressed alternatively in terms of their corresponding structure, such as a suitably programmed processor and associated memory. It should also be appreciated that particular combinations of the various features described and defined in any aspects of the present disclosure can be implemented and/or supplied and/or used independently.

The present disclosure also provides computer programs and computer program products comprising software code adapted, when executed on a data processing apparatus, to perform any of the methods and/or for embodying any of the apparatus and system features described herein, including any or all of the component steps of any method. The present disclosure also provides a computer or computing system (including networked or distributed systems) having an operating system that supports a computer program for carrying out any of the methods described herein and/or for embodying any of the apparatus or system features described herein. The present disclosure also provides a computer readable media having stored thereon any one or more of the computer programs aforesaid. The present disclosure also provides a signal carrying any one or more of the computer programs aforesaid. The present disclosure extends to methods and/or apparatus and/or systems as herein described with reference to the accompanying drawings. To further describe the present technology, examples are now provided with reference to the figures.

FIG. 1 illustrates an aspect of an environment 100 for a runtime enforcement system 102 in which an embodiment may be practiced. In at least one embodiment, the runtime enforcement system 102 may include software (e.g., algorithms, executable instructions, etc.) implemented at a computing device, such as a computing device 1000 described further below with reference to FIG. 10. The runtime enforcement system 102 may be used, e.g., by a client, customer, or consumer or one or more members, or entities, of a partnership. In at least one embodiment, the client or consumer may be an organization, company, institute, etc. providing or requesting use of one or more services offered by the one or more members of the partnership. Furthermore, in at least one embodiment, the runtime enforcement system 102 may be used to manage, monitor, and enforce terms and conditions of the partnership, in view of a third party, such as a specific client or consumer, or customer.

The environment 100 may include an entity terminal 104, as depicted in FIG. 1. In some embodiments, the entity terminal 104 may be a computing device or computing system associated with the one or more entities of the partnership managed by the runtime enforcement system 102.

In at least one embodiment, the runtime enforcement system 102 may receive requests and information input to the runtime enforcement system 102 by the entity terminal 104. In some instances, one or more portions of the runtime enforcement system 102 may be hosted at the entity terminal 104. In other embodiments, however, the runtime enforcement system 102 may instead be hosted at a remote computing device that is communicatively linked, e.g., via a wireless communication channel, to the entity terminal. In at least one embodiment, the entity terminal 104 may include multiple computing devices or computing systems associated with different members of a partnership.

In at least one embodiment, the entity terminal 104 may be used by members of one or more entities providing one or more services through an agreement between the one or more entities. Management and implementation of the agreement may be provided by the runtime enforcement system 102 to monitor and evaluate events for which use of the service may be requested. In at least one embodiment, a set of conditions may correspond to attributes (e.g., terms, allowances, conditions, etc.) defining how a set of services may be provided by the one or more entities. The set of conditions may be extracted to generate one or more data structures that may be usable to, along with context information of a computer-detected event occurring in real-time, identify whether the event conforms to the set of conditions. Further details of the runtime enforcement system 102 are described further below.

In at least one embodiment, the entity terminal 104 of the environment 100 may be used by an individual, a computing system, an executing software application, a computing service, a computing resource, or other party capable of controlling input to and receiving output from runtime enforcement system 102. The entity terminal 104 may be a computing device, e.g., a processor, that has access to a set of user records and/or a profile with the runtime enforcement system 102, and may allow a set of credentials (e.g., username, password, etc.) registered with the runtime enforcement system 102 to be entered to access the runtime enforcement system 102. In at least one embodiment, a user of the entity terminal 104 may present, or otherwise prove, the possession of security credentials, such as by inputting a password, access key, and/or digital signature, to gain access to resources of a user account. The users may include members of one of the entities participating in the agreement or an administrator of the runtime enforcement system 102. In at least one embodiment, the user may, at the entity terminal 104, create an account with the runtime enforcement system 102.

In at least one embodiment, the runtime enforcement system 102 may include one or more subsystems. For example, as shown in FIG. 1, the runtime enforcement system 102 may include an input management subsystem 106, a compute and storage engine 108, and a runtime platform management subsystem 110. Furthermore, the runtime enforcement system 102, and the associated subsystems, may be implemented by a computing architecture, including various software applications, consoles, databases, and platforms. In at least one embodiment, a partner and/or a customer may be onboarded via the computing architecture and rules may be generated during onboarding to be applied to corresponding partnerships during runtime of the runtime enforcement system 102.

The input management subsystem 106 may receive information input at the entity terminal 104. In at least one embodiment, the input received from the entity terminal 104 may include one or more configurations of a document, such as a contract. In at least one embodiment, one or more documents may be provided to the input management subsystem 106, where the one or more documents may include one or more sets of conditions (e.g., configurations) corresponding to an agreement between two or more entities providing services. Further, in at least one embodiment, the one or more documents may include one or more sets of conditions presented as natural language text that can be extracted from the one or more documents. In at least one embodiment, the one or more sets of conditions may be extracted from the document using one or more machine learning models. In at least one embodiment, the one or more sets of conditions may be validated to generate a validated set of conditions. In some instances, one or more machine learning models may be used to generate the validated set of conditions, which may then be stored at a database as a first machine-readable data structure. In at least one embodiment, the validated set of conditions may be stored at a database as one or more configurations, which may be the one or more first machine-readable data structures.

In at least one embodiment, the compute and storage engine 108 may retrieve the one or more configurations from the database and transform the configurations into one or more second data structures. In at least one embodiment, the one or more second data structures may be one or more matrix representations. For example, the one or more matrix representations may represent logic for validation of a detected event during runtime of the runtime platform management subsystem 110. Additional information, including one or more of event context information associated with a potential future event, data corresponding to a condition imposed on the potential future event, and inclusion/exclusion information relating to the condition, may be obtained along with the one or more configurations. In at least one embodiment, the one or more second data structures may be generated using the one or more first data structures and the additional information.

In at least one embodiment, at least a portion of the runtime platform management subsystem 110 may be deployed during run-time to apply logic to implement relevant configurations of the one or more configurations when an event is detected to occur. In at least one embodiment, the event may be detected to occur based, at least in part on a request indicated at an end terminal 112. For example, the request may be sent to the runtime platform management subsystem 110 in response to a transaction facilitated at the end terminal 112. In at least one embodiment, the transaction may be a purchase, use of an object with embedded information such as a credit card, user-prompted requests, detection of a customer entering a store, etc.

In at least one embodiment, the runtime platform management subsystem 110 may obtain the one or more second data structures as well as real-time event context information 114 relating to one or more attributes associated with the event. For instance, the real-time context information may include entity identifier associated with an entity. In at least one embodiment, the real-time event context information 114 may be obtained from the end terminal 112. In at least one embodiment, the end terminal 112 may include multiple computing devices or computing systems corresponding to various members associated with a partnership.

In at least one embodiment, the runtime platform management subsystem 110 may generate a first result set indicating a subset of the one or more configurations that are applicable to the entity associated with the entity identifier. Furthermore, in at least one embodiment, the first result may be generated based at least in part on a list of entity identifiers. In addition, in at least one embodiment, the runtime platform management subsystem 110 may output a second result set 116 that is derived from the first result set and the one or more second data structures. In at least one embodiment, the second result set 116 may indicate whether the event conforms to a configuration from the one or more configurations that is applicable to the entity.

Figure 2:
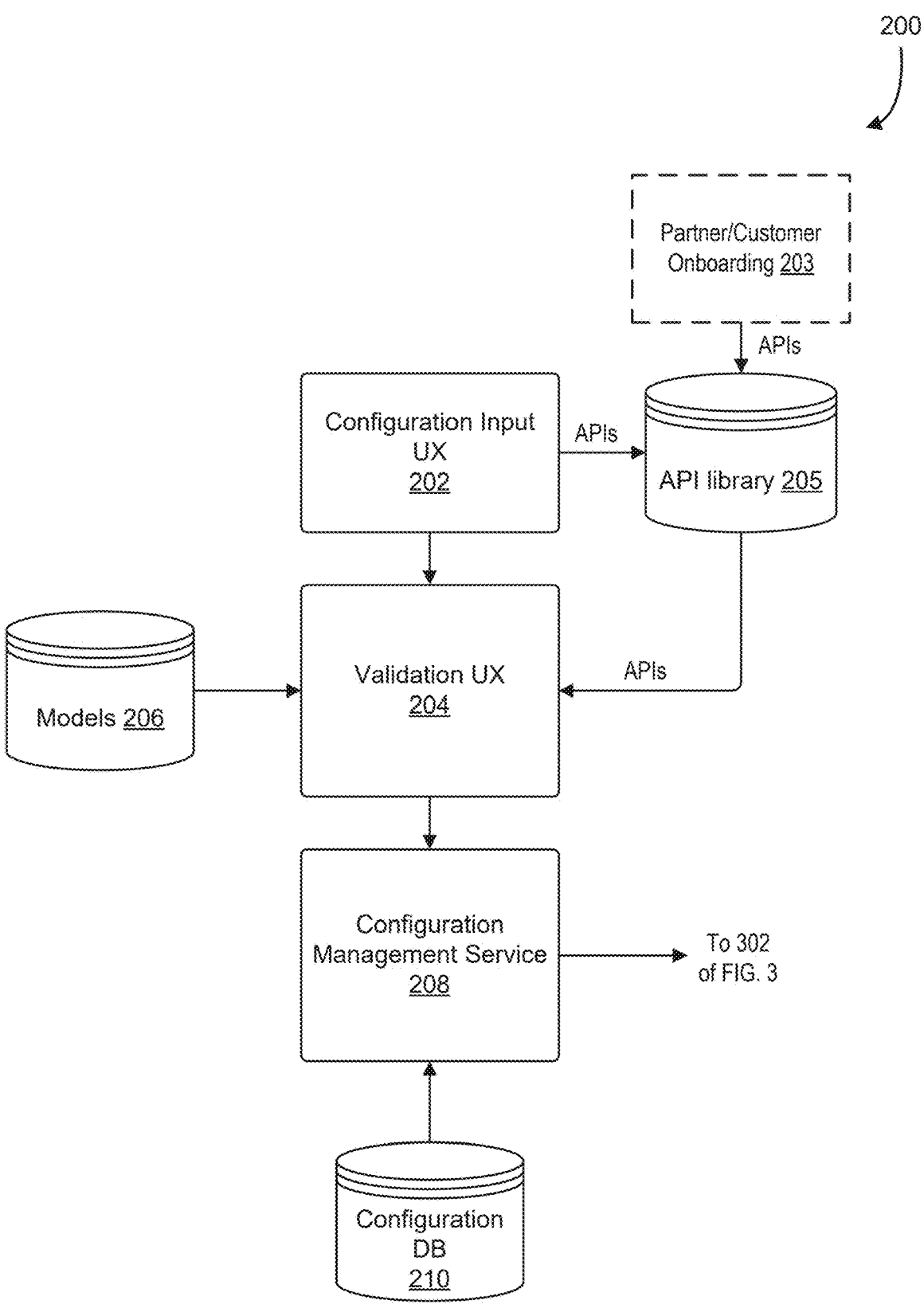
FIG. 2 illustrates an example of an input management subsystem of the runtime enforcement system of FIG. 1, in accordance with an embodiment.
Figure 4:
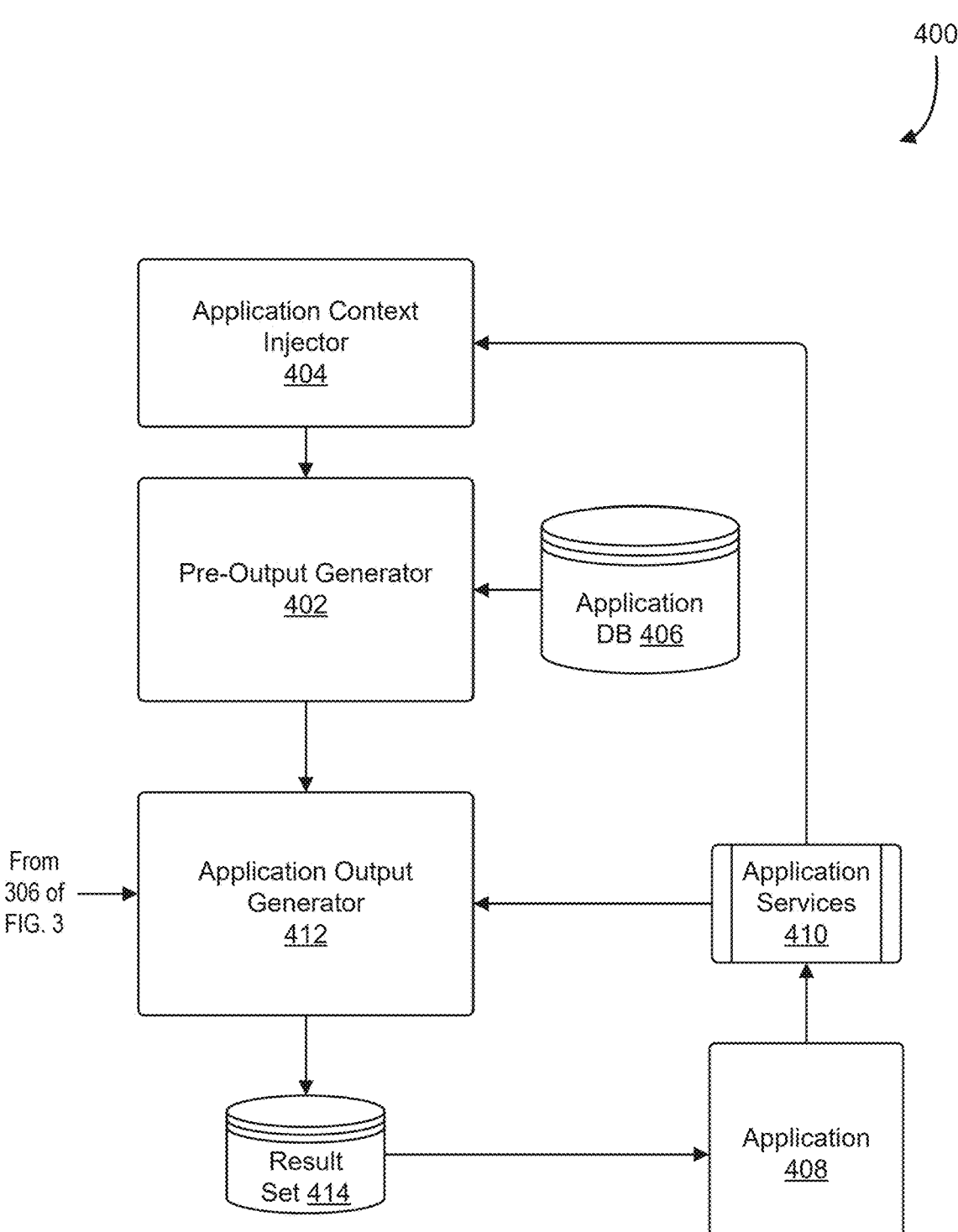
FIG. 4 illustrates an example of a runtime platform management subsystem of the runtime enforcement system of FIG. 1, in accordance with an embodiment.

Further details of a runtime enforcement system are depicted in FIGS. 2-4. In at least one embodiment, the runtime enforcement system illustrated by FIGS. 2-4 may be an example of the runtime enforcement system 102 of FIG. 1. For example, an embodiment of an input management subsystem 200 is illustrated in FIG. 2. In at least one embodiment, the input management subsystem 200 may be an example of the input management subsystem 106 of FIG. 1. Operations implemented at the input management subsystem 200 may be performed independent of run-time deployment of the runtime enforcement system. For example, the input management subsystem 200 may be used to identify sets of conditions from information input thereto to be used during run-time deployment of the runtime enforcement system. The input management subsystem 200 may include various components, including, at least in one embodiment, a first component 202, which may be a configuration input user experience (UX) 202. The configuration input UX 202 may receive information at an interface of a computing device, such as from the entity terminal 104 of FIG. 1. In at least one embodiment, the information may include one or more documents. In some instances, the one or more documents may include natural language text. Moreover, in at least some embodiments, the one or more documents may include contracts including one or more terms or sets of conditions, e.g., configurations, specific to an agreement between two or more entities. In at least one embodiment, the one or more documents may include historical data related to any agreements, e.g., all past contracts, between the two or more entities.

In at least one embodiment, the one or more documents received at the configuration input UX 202 may be passed to a validation UX 204. At the validation UX 204, the one or more documents may be input to one or more models 206 trained to identify configurations from information received at the configuration input UX 202. For example, the one or more models 206 may be trained, using the one or more documents, to identify configurations from the one or documents relevant to specific agreements between two or more entities. The trained one or more models 206 may then be used to infer configurations in one or more documents at the validation UX 204 as well as identify relevant configurations that may be missing from the one or more documents. Further details of training of one or more models are provided below, with reference to FIG. 9. In at least one embodiment, information received by the validation UX 204 from the configuration input UX 202 may include, in addition to documents such as contracts, other types of documents that may include information that are relevant to the contracts, such as documented historical transactions, historical events, etc. In addition, in some embodiments, the information may also include data relevant to specific consumers using one or more services provided by the two or more entities of the agreement.

In at least one embodiment, the trained one or more models 206 may be called by the validation UX 204 when the validation UX 204 receives the one or more documents. As an example, the validation UX 204 may call an API (such as one or more APIs 1110 shown in FIG. 11) and input one or more documents to the API. The API may provide the one or more documents to the trained one or more models 206 and return, based on an inferred output of the trained one or more models 206, an indication of whether configurations identified in the one or more documents comply or contradict with configurations that the trained one or more models 206 were trained upon.

In at least one embodiment, the one or more APIs, when called, may be retrieved from an API library 205, which may be a repository or database of APIs. The APIs may be performed to enforce rules identified and generated based on contracts defining partnerships between two or more partners. In at least one embodiment, at least a portion of the APIs stored at the API library 205 may be created, e.g., generated, and registered to the runtime enforcement system during partner and/or customer onboarding 203. In at least one embodiment, partner/customer onboarding 203 may be performed via a computing architecture in conjunction, e.g., in parallel, with operation of the runtime enforcement system and may provide data to be used by the runtime enforcement system. For example, partners may be onboarded to be engaged in partnerships that are defined by one or more contracts, where the partnership includes terms and conditions for the partners to offer products and services in conjunction with one another. Similarly, customers may be onboarded to be provided with offers from the partners, where the offers may be generated according to terms and conditions defined by contracts. The terms and conditions identified during onboarding of the partners and customers may be used to create APIs, which may be called during the onboarding process to ensure that a partnership complies with relevant contracts. As described further below, the APIs may be called during operation of the runtime enforcement system to similarly verify that processing of data and generation of offers to customers adhere to rules defined by contracts between partners. The APIs may be called according to the specific rules that each APIs is configured to enforce.

Furthermore, in at least one embodiment, the configurations that are validated at the validation UX 204 may be sent to a configuration management service 208 to create one or more APIs, which are also to be stored at the API library 205. The one or more APIs may be generated according to specific attributes of the validated configurations and may be used to enforce rules corresponding to the validated configurations at runtime of the runtime enforcement system. In at least one embodiment, the one or more APIs generated by the configuration management service 208 and during partner/customer onboarding 203 may include an API to enforce data visibility rules, an API to enforce an enablement start date (e.g., a start to an applicability of contract), an API to enforce an enablement end date (an end to an applicability of a contract), an API to enforce fee schedules, an API to enforce transaction limits, an API to enforce event occurrence limits, an API to enforce fraud risk appetite, an API to enforce geopolitical limits, and an API to enforce terms and conditions for a specific partner of a partnership, among others. The one or more APIs, once created, may be registered and stored at the API library 205.

In at least one embodiment, the one or more models 206 may include one or more language models. For instance, in some embodiments, the one or more models 206 may include a large language model (LLM). In at least one embodiment, the one or more models 206 may include a small language model (SLM). In yet another embodiment, the one more models 206 may include Retrieval-Augmented Generation (RAG) used in combination with a language model, where the RAG may be a two-phase process that includes a document retriever to select documents in response to a request, and formulation of an answer by the language model. Furthermore, in at least one embodiment, the one or more models 206 may utilize prompt engineering to refine inputs to a language model to obtain optimized outputs. In at least some instances, a variety or combination of models may be used as the one or more models 206 to identify and validate detected configurations from information received at the validation UX 204.

In at least one embodiment, the configurations that are validated at the validation UX 204 may be passed to the configuration management service 208 which may facilitate storage of configurations at a configuration database 210 in addition to generation and registration of APIs. In least one embodiment, configurations stored at the configuration database 210 may be added to, retrieved from, deleted from, and otherwise modified at the configuration database 210 by the configuration management service 208. For example, the configuration management service 208 may perform maintenance of the configurations stored at the configuration database 210. In at least one embodiment, the configuration management service 208 may provide relevant configurations to a compute and storage engine 300 depicted in FIG. 3.

In at least one embodiment, the compute and storage engine 300 may be used to transform configurations into data structures that can be used to evaluate computer-detected events during runtime deployment of the runtime enforcement system. The compute and storage engine 300 may be an embodiment of the compute and storage engine 108 of FIG. 1. Operations implemented at the compute and storage engine 300 may be performed independent of runtime deployment of the runtime enforcement system. For example, the compute and storage engine 300 may be used to convert the configurations to a format in which the configurations are stored at the configuration database 210 into one or more data structures which may be used to indicate how a respective configuration may affect a detected event during runtime deployment of runtime enforcement system. In at least one embodiment, one or more configurations retrieved from the configuration database 210 by the configuration management service 208 of FIG. 2 may be received at an event management service 302 of the compute and storage engine 300 of FIG. 3.

In at least one embodiment, the event management service 302 may facilitate an event-based process. In at least another embodiment, the event management service 302 may implement an API-based process. In yet another embodiment, the event management service 302 may implement a process for event management that may include point-to-point API integrations that are event-based. In at least some instances, the event management service 302 may operate as an interface between the configuration management service 208 and a data structure generator 304 of the compute and storage engine 300. In at least one embodiment, an event may be addition, retrieval, or deletion of one or more configuration to the configuration database 210 of FIG. 2. For example, an event may correspond to modification of a configuration at the configuration database 210, where the configuration may represent one or more terms, fees, offers, and/or various different types of incoming records obtained from the information received by the input management subsystem 200 of FIG. 2.

In at least one embodiment, modification of a configuration (e.g., addition, deletion, updating, etc.) at the configuration database 210 may cause the configuration management service 208 to notify the event management service 302. In response to the notification, the event management service 302 may call one or more APIs, and retrieve the APIs from the API library 205 of FIG. 2, to cause the modified configuration to be passed to the data structure generator 304. In at least one embodiment, the configuration may be reformatted into a data structure that can be stored at a data structure database 306 of the compute and storage engine 300. In at least one embodiment, the data structure may be a matrix vector. In at least one embodiment, one or more APIs may be called according to relevance to the configuration, the modification or request to retrieve the configuration, and used to generate the matrix vector such that specific conditions and constraints associated with the configuration is incorporated into the data structure.

In at least one embodiment, the configuration may be reformatted into a matrix representation by at least combining the configuration with additional information obtained from a comparison tool 308. In at least one embodiment, the comparison tool 308 may be pre-populated with a multi-dimensional or N-dimensional matrix, context, database names, database field names, and database field values, which may be related to all possible configurations stored in the configuration database 210. In such embodiments, N may be a number of variables stored in the matrix. For example, data related to all the possible configurations may be stored among multiple databases. In at least one embodiment, the data may be consolidated into the comparison tool 308 which may allow field values of the data to be mapped to the information input to the input management subsystem 200 (e.g., to the configurations identified from the information). As such, data structure representations of the configurations obtained from the configuration database 210 may be compared to the data provided by the comparison tool 308. In at least one embodiment, the comparison tool 308 may include a lookup table storing key-value pairs, although other data structures are possible. In at least another embodiment, the comparison tool 308 may include metadata corresponding to data elements relevant to the possible configurations and data elements of the configurations.

In at least one embodiment, context, such as the context that may be included and used for comparison to configurations at the comparison tool 308, may refer to specific circumstances corresponding to an event. For example, a consumer may be at a store and an event, such as a point-of-sale offer may occur. A context of this event may include, for example, a type of transaction the consumer facilitates in response to the offer, what type of transactions are associated with one or more entities providing the offer, a time of day the offer is made, and a commodity being offered, whether a sequence of transactions may occur in relation to the offer, whether a particular account of the consumer is associated with the offer.

In at least one embodiment, the configurations received from the configuration database 210 and transferred to the data structure generator 304 via the event management service 302 may be mapped according to the N-dimensional matrix of the comparison tool 308 to create one or more data structures, such as matrix vectors. For example, a matrix vector may be a representation of one of the configurations once the configuration has been converted using the comparison tool 308 by mapping the configuration to dimensions of the comparison tool 308 including, but not limited to context, a key, a value representing a list of the configuration database 210, a column value, etc. In at least one embodiment, the one or more data structures, e.g., matrix values, may be stored at a data structure database 306.

In at least one embodiment, one or more matrix vectors may be retrieved from the data structure database 306 during runtime deployment of the runtime enforcement system by a runtime platform management subsystem 400, as shown in FIG. 4. The runtime platform management subsystem 400 may be an exemplary embodiment of the runtime platform management subsystem 110 of FIG. 1 and may be used to enforce terms and conditions associated with an agreement between two or more entities providing services in real-time during an event where one or more of the services are requested. In at least one embodiment, the runtime platform management subsystem 400 may be deployed in real-time, during an event that is detected to occur. For example, the event may be detected by a computer, e.g., a computing device, which may trigger activation of the runtime platform management subsystem 400 while the event is occurring.

In at least one embodiment, the runtime platform management subsystem 400 may include a pre-output generator 402. In at least one embodiment, the pre-output generator 402 may receive context injection from an application context injector 404 of the runtime platform management subsystem 400. Furthermore, in at least one embodiment, the pre-output generator 402 may also receive data from an application database 406. Context may be injected to the pre-output generator 402 and data may be passed to the pre-output generator 402 from the application database 406 in response to an execute command generated at an application output generator 412 in response to detection of an event, e.g., by a computer, in which a request for one or more services from one or more entities may be invoked. In at least some instances, retrieval of the various elements from the application context injector 404 and the application database 406 may be facilitated by calling one or more APIs from the API library 205.

In at least one embodiment, the application database 406 may provide various types of data related to an event, an agreement between two or more entities, and services provided by the entities, including, but not limited to, demographic information, product information, geopolitical information. The application database 406 may collect such data from various sources, such as measurement data and reference data stored at memory locations or database, from transaction product processors, from stored contracts, etc. In at least one embodiment, the application database 406 may include any intelligence that may be useful information regarding any possible events that may occur.

In at least one embodiment, the application context injector 404 may obtain contextual information according to an event detected to occur based on a notification from an application 408. In at least one embodiment, the application 408 may be a software program used to receive data and requests at a user terminal, such as the end terminal 112 of FIG. 1. For example, the software program may operate as an interface between a user (e.g., consumer or agent offering services provided by one or more entities), and the runtime enforcement system. In at least one embodiment, contextual information may be registered with the pre-output generator 402 by the application context injector 404. The contextual information that is registered may include application context, entity context, customer context, as well as other characteristics specific to an event.

In at least one embodiment, one or more APIs may be identified based on relevance to the contextual information injected from the application context injector 404 and to data from the application database 406. The identified one or more APIs may be called to enforce terms and conditions associated with the data from the application database as well as attributes of the one or more configurations corresponding to the data structure retrieved from the data structure database 306.

As an example, the event may be triggered by a transaction, such as a consumer using a credit card to purchase a service or product offered by an entity, that is input as a request to the application 408. Contextual data, such as what type of store or business, customer information associated with the credit card, a location of the transaction, a time of day that the transaction is occurring at may be identified by, provided to the application context injector 404 from the application 408 by application services 410. In at least one embodiment, the application services 410 may be one or more tools to identify contextual information received by the application 408 and transmit the contextual information to the application context injector 404. In at least one embodiment, the contextual information obtained by the application services 410 may also be transmitted to the input management subsystem 106 and to the compute and storage engine 108 to continually update information stored and used thereat.

Figure 5:
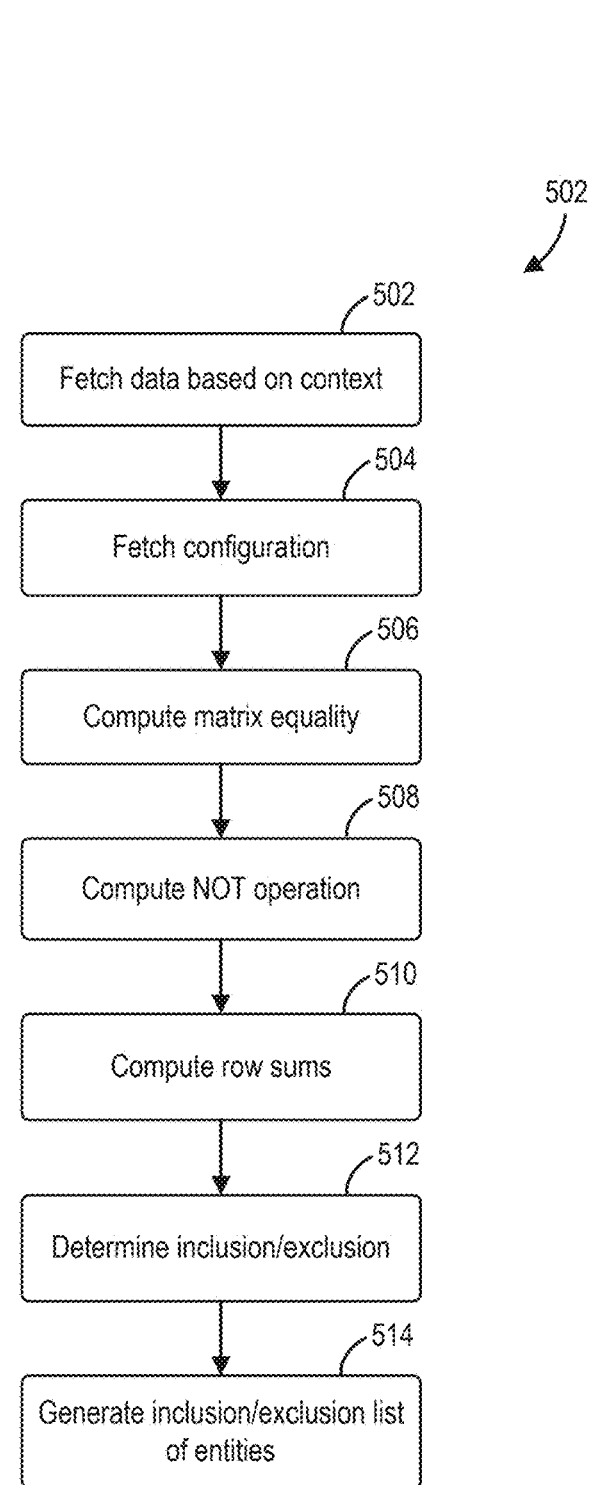
FIG. 5 illustrates an example of sequence of operations performed at a pre-output generator of the runtime platform management subsystem of FIG. 4, in accordance with an embodiment.

In at least one embodiment, upon receiving the contextual information from the application services 410, the application context injector 404 may pass contextual information to the pre-output generator 402 in a format that allow the contextual information to be used by the pre-output generator 402. At the pre-output generator 402, various operations may be implemented to generate a result set, which may include utilizing an output of the one or more APIs called to enforce partnership terms, conditions, rules, and/or agreements. As an example, a list of entity identifiers to be included or excluded from the contextual information may be computed. An example of a sequence of operations 500 performed at the pre-output generator 402 is illustrated in FIG. 5.

At a first step 502 of the sequence of operations 500 of the pre-output generator 402, data from the application database 406 of FIG. 4 is obtained. In at least one embodiment, the data retrieved from the application database 406 may be selected based on the contextual information injected into the pre-output generator 402 by the application context injector 404 and constraints imposed by the one or more APIs. In at least one embodiment, the data fetched from the application database 406 may be transposed into a matrix to form a first result set.

At a second step 504 of the sequence of operations 500, a matrix vector representing a configuration may be obtained from the data structure database 306 of FIG. 3. In at least one embodiment, the matrix vector fetched from the data structure database 306 may be a second result set.

At a third step 506 of the sequence of operations 500, a matrix equality may be computed. In at least one embodiment, the matrix equality may be computed by determining an equality for each row of the first result set with respect to a column from the second result set. For example, a computation to verify whether a row of the first result set is equal to a column of the second result set may be performed for each row of the first result set.

At a fourth step 508 of the sequence of operations 500, a NOT operation may be performed to on the matrix equalities computed at the third step 506. In at least one embodiment, performing the NOT operation may indicate which of the matrix equalities correspond to a true result and which correspond to a false result depending on the results from the third step 506.

At a fifth step 510 of the sequence of operations 500, a sum of each row from the results of the fourth step 508 may be computed and the sums may be used at a sixth step 512 of the sequence of operations 500. In at least one embodiment, at the sixth step 512, a row may be included or excluded from subsequent use for validating an event against terms and conditions of an agreement between two or more entities offering services or products to a third party. In at least one embodiment, the sums computed at the fifth step 510 may compared to inclusion/exclusion logic or flags to identify which rows are to be include and which row are to be included. For example, if a sum of a row is 0, then the row may be included and if a sum of a row is not 0, then the row may be excluded.

At a seventh step 514 of the sequence of operations 500, rows that satisfy the inclusion/exclusion logic to be included may be identified and output by the pre-output generator 402. In at least one embodiment, the rows to be included may be output by the pre-output generator 402 where each included row may be associated with a corresponding entity identifier. In at least one embodiment, rows to be excluded may be output by the pre-output generator 402 where each excluded row may be associated with a corresponding entity identifier.

Returning to FIG. 4, in at least one embodiment, the output (e.g., a first result set) of the pre-output generator 402 may be compared to a data structure retrieved by the application output generator 412 from the data structure database 306 of FIG. 3. In at least one embodiment, the application output generator 412 is also updated by the contextual information identified by the application services 410 corresponding to an event that is occurring. The application output generator 412 may, as one example, cause one or more data structures, e.g., matrix vectors, to be provided by the data structure database 306 to the application output generator 412 where the contextual information may be used to identify which matrix vectors are to be transferred to the application output generator 412 to be used thereat. In at least one embodiment, the application output generator 412 may also receive, in response to invoking the execute command, information from the application services 410, which may include at least information regarding prior, e.g., historical, transactions implemented by the application 408.

At the application output generator 412, the first result set from the pre-output generator 402 may be evaluated against the one or more matrix vectors and prior transactions received by the application output generator 412. By comparing the first result set with data from the data structure database 306 and the application services 410, a second result set 414 may be generated at the application output generator 412. In at least one embodiment, the second result set 414 may be a set of records identified and selected by the application output generator 412 that may be consumed (e.g., used or applied) by the application 408. For example, the set of records of the second result set 414 may correspond to one or more recommended actions that the application 408 may perform in response to an event that is detected to be occurring. As an example, the set of records may include one or more offers that may be presented to a particular customer at a store based on prior transactions between the customer and the store, what the customer is currently seeking, a geolocation of the store or the customer's residence, etc.

In at least one embodiment, the second result set 414 may be provided to the application 408 to be displayed to the customer. In at least one embodiment, the application 408 may be presented to a customer through a communication channel previously agreed to by the customer. For example, a customer may have specified a preference to receive communication from a store via text message and/or email, and the application 408 may cause the second result set 414 to be provided to the customer accordingly.

An example of a method 600 for a runtime enforcement system to capture and validate terms and conditions of an agreement is illustrated in FIG. 6. In at least one embodiment, the method 600 may be performed by an input management subsystem, such as at the input management subsystem 106 of FIG. 1 and 200 of FIG. 2. Some or all of the method 600 (or any other methods described, or variations and/or combinations of those methods) may be performed by one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of the method 600 may be performed by any suitable system, such as the computing device 1000 of FIG. 10. The method 600 includes a series of operations where a document is obtained, a set of conditions is extracted from the document and validated, and the validated set of conditions may be stored at a database.

At block 602, the method 600 may include receiving one or more configuration as inputs. In at least one embodiment the one or more configurations may include terms and conditions of an agreement between two or more entities which may be received by the input management subsystem from a user. For example, the user may directly enter the one or more configurations at a user interface of the one or more computing systems implementing the runtime enforcement system or may initiate transmission of the configurations to the one or more computing system from another computing device. In yet another embodiment, a machine learning model may be used to input the configurations to the input management subsystem.

At block 604, the method 600 may include providing the configurations to one or more models. In at least one embodiment, as described above with reference to FIG. 3, the one or more models may include a machine learning model trained to validate the configurations against prior agreements established between the two or more entities. For example, the machine learning model may parse the document to identify the configurations therein. The machine learning model may infer a compliance, or lack thereof, of the configurations to the prior agreements. Further details of a process for training the machine learning model is depicted in FIG. 9. In other embodiments, the one or more models may additionally or alternatively include RAG, which may be implemented in combination with one or more machine learning models, or prompt engineering.

At block 606, the method 600 may include receiving validated configurations from the one or more models. At block 608, one or more APIs may be generated based on the validated configurations. For example, as described above in conjunction with FIG. 2, the APIs may be created using a configuration management service of the input management subsystem and the APIs may be registered to an API library. The APIs may be created to be callable to enforce the terms and conditions of the agreement, e.g., by inputting agreement parameters to the APIs, which, in turn, may output rules and constraints to be imposed on the parameters according to the agreement. Furthermore, the validated configurations may be saved to a configuration database at block 610.

An example of a method 700 for a runtime enforcement system to convert stored configurations into computer-readable data structures is illustrated in FIG. 7. In at least one embodiment, the method 700 may be performed by a compute and storage engine, such as at the compute and storage engine 108 of FIG. 1 and 300 of FIG. 3. Some or all of the method 700 (or any other methods described, or variations and/or combinations of those methods) may be performed by one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of the method 700 may be performed by any suitable system, such as the computing device 1000 of FIG. 10. The method 700 includes a series of operations where a validated set of conditions is transposed into one or more data structures such that the validated set of conditions can be used during runtime deployment of the runtime enforcement system.

Figure 11:
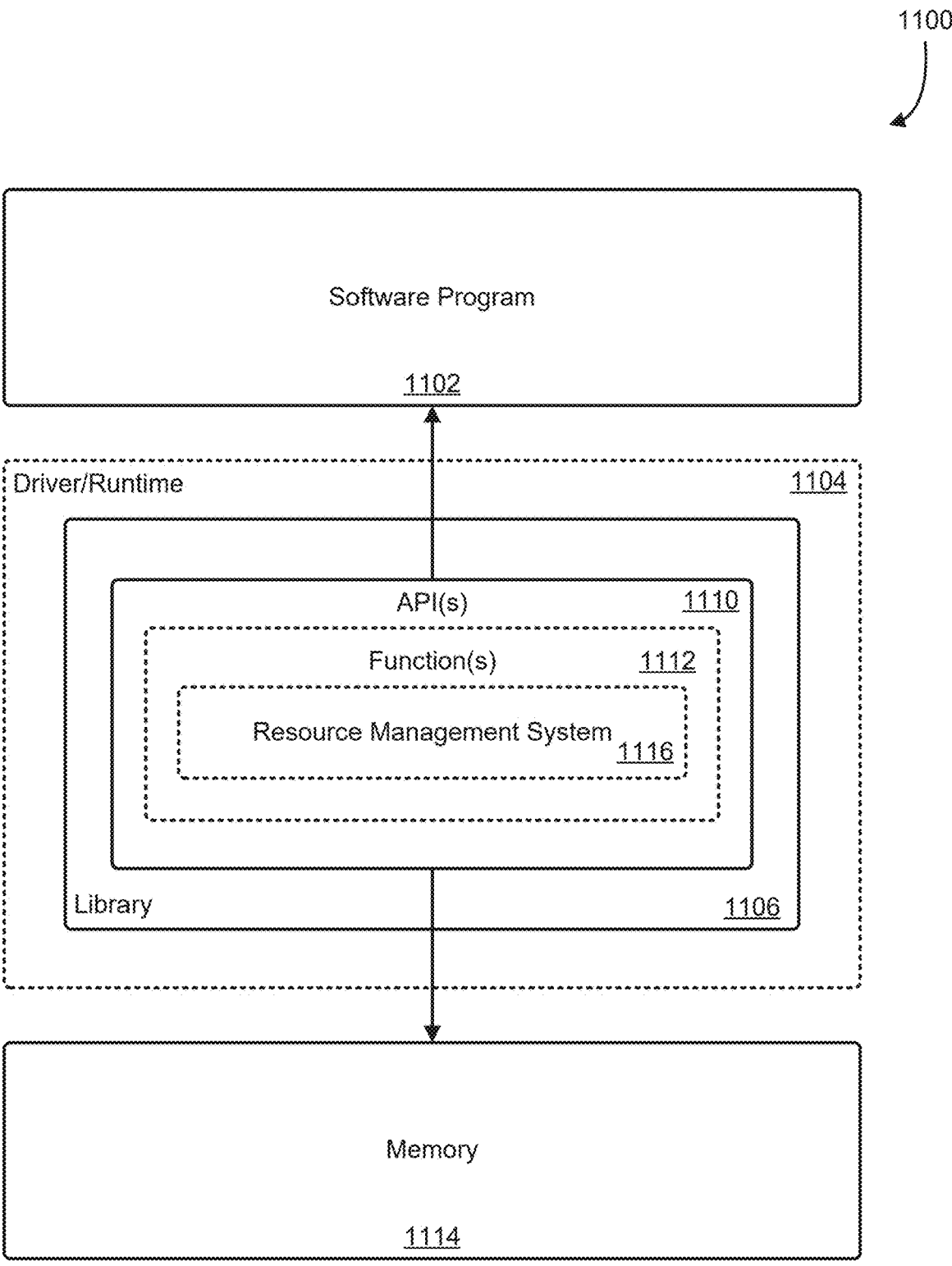
FIG. 11 illustrates an application programming interface that returns a candidate location, in accordance with an embodiment.

At block 702, the method 700 may include retrieving one or more configurations from the configuration database. In at least one embodiment, one or more APIs (e.g., as shown at FIG. 11) may be called by the input management subsystem when one or more configurations are saved to the one or more configurations to cause an identifier (e.g., name) and location of the one or more configurations in the configuration database to be provided to the compute and storage engine by the API. The identifiers and locations of the configurations may be used to locate and obtain the configurations from the configuration database.

At block 704, the method 700 may include mapping each configuration to a matrix of the comparison tool. In at least one embodiment, the matrix of the comparison tool may be a N-dimensional matrix incorporating various elements relevant to the configurations stored at the configuration database, and/or to possible events to which the configurations may be applied. By mapping a configuration to the matrix of the comparison tool, the configuration may be transposed into a matrix vector at block 706 of the method 700. In at least one embodiment, the matrix vector may be a representation of the configuration where the configuration may be mapped to one or more of a context, a key, and a value representing a list of database, table, and column value.

At block 708, the method 700 may include storing the matrix vectors representing the configurations at a data structure (e.g., matrix vector) database.

An example of a method 800 for a runtime enforcement system to validate an event occurring in real-time against stored configurations and recommend actions in real-time based on the validation is illustrated in FIG. 8. In at least one embodiment, the method 800 may be performed by a compute and storage engine, such as at the runtime platform management subsystem 110 of FIG. 1 and 400 of FIG. 4. Some or all of the method 800 (or any other methods described, or variations and/or combinations of those methods) may be performed by one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of the method 800 may be performed by any suitable system, such as the computing device 1000 of FIG. 10. The method 800 includes a series of operations where configurations that are relevant and applicable to the event may be identified and used to generate recommendations for offers that may be presented to a customer or consumer requesting access to one or more services.

At block 802, the method 800 may include receiving a context injection in response to detection of an event occurring. In at least one embodiment, the event may be detected by a computer, e.g., by a computing system where a transaction is initiated or a request related to a service is received. An application, e.g., software application, of the runtime platform management subsystem that operates as an interface between the computing system at which the event is detected to occur and other components of the runtime platform management subsystem may provide contextual information regarding the event, which may be used by a pre-output generator and an application output generator.

At block 804, the method 800 may include invoking an execute command in response to the detection of the event and invoking the pre-output generator. In at least one embodiment, one or more of the execute command and the pre-output generator may be invoked by calling one or more APIs from an API library, at block 806. As an example, an API, when called, may receive the contextual information, and inject the contextual information into the pre-output generator by imposing terms and conditions associated with a corresponding agreement. As a result, the contextual information may be modified according to the terms and conditions enforced by the API. The pre-output generator may fetch data from an application database based on the contextual information and compute a list of entities that are received at block 808. The list of entities identifies which entities are to be included or excluded according to logic described above with reference to FIG. 5.

At block 810, the method 800 may include receiving a final result set from the application output generator. For example, a second result set may be generated based on the injected contextual information, one or more configurations retrieved from the configuration database, and information regarding the event.

At block 812, the method may include generating a final result set by comparing the second result set to the first result set to identify which entities, and corresponding configurations, are to be included or excluded from use in determining allowable actions to be recommended. The recommendations generated based on the final result set may be used to present offers to the consumer or customer at block 814. In at least one embodiment, the offers may be displayed at an interface of a computing device accessible to the consumer or customer.

An example of a method 900 for training a machine learning model to infer compliance of a configuration to one or more agreements between two or more entities is depicted in FIG. 9. Some or all of the method 800 (or any other methods described, or variations and/or combinations of those methods) may be performed by one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of the method 800 may be performed by any suitable system, such as the computing device 1000 of FIG. 10. In at least one embodiment, the machine learning model may be trained to extract configurations from a document that include natural language text by training the machine learning model using other natural language text. For example, the machine learning may be trained using natural language text of one or more training documents that may include past or historical configurations, and once trained, the machine learning model may identify and extract other natural language text in a document that is different from the one or more training documents.

At block 902, the method 900 may include receiving parameters input to the one or more computing systems. In at least one embodiment, the parameters may include one or more agreements, e.g., contracts, between two or more entities, as well as specific terms and phrases (e.g., configurations) that may be included in the agreements. For example, the agreements may be historical data documenting relationships between the two or more entities where the configurations of the relationships may be provided in the agreements. In at least one embodiment the agreements may provide a historical record of the configurations of the agreements and may be used as ground truth data for training the machine learning model. In at least one embodiment, the parameters may be received at an interface of the one or more computing systems, from a user, a software application, a computing device, a remote platform (e.g., a cloud), etc.

At block 904, the method 900 may include calculating a loss function at least by comparing a step name predicted by the one or more machine learning models to ground truth data. In at least one embodiment the ground truth data may include actual, or verified (e.g., by a user, a software application, etc.) step names corresponding to the input parameters. In at least one embodiment, calculating the loss function may include utilizing cross-entropy loss and gradient descent to minimize the loss function. Other type of loss functions and optimization techniques may be used, however.

At block 906, the method 900 may include using the loss function to update one or more parameters of the one or more machine learning models. In at least one embodiment, updating the parameters of the machine learning models may include optimizing neural network weights. In at least one embodiment, the one or more parameters may be updated based on gradients of the loss function.

At block 908, the method 900 may include inferring whether the one or more machine learning models are sufficiently trained. In at least one embodiment, the one or more machine learning models are considered to be sufficiently trained if performance of the one or more machine learning models meet one or more accuracy values (e.g., one or more accuracy thresholds) or one or more convergence values (e.g., one or more convergence thresholds). Furthermore, in at least one embodiment, a human enforcement loop may be utilized to determine whether the one or more machine learning models are sufficiently trained. For example, a human (e.g., a programmer) may evaluate whether the machine learning models identify target configurations in the contracts. For example, the machine learning models may be able to identify 80% of the target configurations in a contract but 20% remain unidentified. In such instances, the human may confirm whether additional training of the machine learning models is demanded. In at least one embodiment, if the one or more machine learning models are not inferred to be sufficiently trained (e.g., the one or more accuracy values are not met), the method 900 returns to block 904 to (re)calculate the loss function based, at least in part, on the one or more (updated) parameters of the machine learning models.

If the one or more machine learning models are deemed sufficiently trained (e.g., the one or more accuracy values are met), the method 900 may proceeds to block 910 to use the one or more machine learning models to perform inferencing. In at least one embodiment, performing the inferencing may include parsing a document to identify configurations therein and compare the configurations to configurations on which the machine learning models were trained to validate compliance of the identified configurations to configurations of prior agreements.

A runtime enforcement system, as described herein, may thereby be employed to manage and enforce terms and conditions of an agreement between two or more entities providing one or more services to a third party. In at least one embodiment, the runtime enforcement system may be used to implement terms and conditions of a credit card associated with a contract between two or more entities, such as a credit card company and a financial institution. In at least one other embodiment, the runtime enforcement system may be used as a personal assistant to assist an individual in tracking and enforcing agreements that the individual may establish among other individuals, with various entities, or with the individual. The runtime enforcement system may provide an automated tool for tracking changes to terms and conditions established between two or more entities, converting the terms and conditions to a format that is usable and readable by a computing system, and enforcing the terms conditions while customizing recommendations to account for circumstances specific to an event occurring in real-time. In at least one embodiment, the runtime enforcement system may draw upon various source of relevant information to deliver an informed and enforceable service to a requester of the service.

Figure 10:
FIG. 10 illustrates a computing device that may be used in accordance with at least one embodiment/an environment in which various embodiments can be implemented.

FIG. 10 is an illustrative, simplified block diagram of a computing device 1000 that can be used to practice at least one embodiment of the present disclosure. In at least one embodiment, the computing device 1000 may be used to implement and perform operations of a runtime enforcement system, as described above with reference to FIGS. 1-9. In various embodiments, the computing device 1000 includes any appropriate device operable to send and/or receive requests, messages, or information over an appropriate network and convey information back to a user of the device. The computing device 1000 may be used to implement any of the systems illustrated and described above. For example, the computing device 1000 may be configured for use as a data server, a web server, a portable computing device, a personal computer, a cellular or other mobile phone, a handheld messaging device, a laptop computer, a tablet computer, a set-top box, a personal data assistant, an embedded computer system, an electronic book reader, or any electronic computing device. The computing device 1000 may be implemented as a hardware device, a virtual computer system, or one or more programming modules executed on a computer system, and/or as another device configured with hardware and/or software to receive and respond to communications (e.g., web service application programming interface (API) requests) over a network.

As shown in FIG. 10, the computing device 1000 may include one or more processors 1002 that, in embodiments, communicate with and are operatively coupled to a number of peripheral subsystems via a bus subsystem. In some embodiments, these peripheral subsystems include a storage subsystem 1006, comprising a memory subsystem 1008 and a file/disk storage subsystem 1010, one or more user interface input devices 1012, one or more user interface output devices 1014, and a network interface subsystem 1016. Such storage subsystem 1006 may be used for temporary or long-term storage of information.

In some embodiments, the bus subsystem 1004 may provide a mechanism for enabling the various components and subsystems of computing device 1000 to communicate with each other as intended. Although the bus subsystem 1004 is shown schematically as a single bus, alternative embodiments of the bus subsystem utilize multiple buses. The network interface subsystem 1016 may provide an interface to other computing devices and networks. The network interface subsystem 1016 may serve as an interface for receiving data from and transmitting data to other systems from the computing device 1000. In some embodiments, the bus subsystem 1004 is utilized for communicating data such as details, search terms, and so on. In an embodiment, the network interface subsystem 1016 may communicate via any appropriate network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols.

The network, in an embodiment, is a local area network, a wide-area network, a virtual private network, the Internet, an intranet, an extranet, a public switched telephone network, a cellular network, an infrared network, a wireless network, a satellite network, or any other such network and/or combination thereof, and components used for such a system may depend at least in part upon the type of network and/or system selected. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering. Many protocols and components for communicating via such a network are well known and will not be discussed in detail. In an embodiment, communication via the network interface subsystem 1016 is enabled by wired and/or wireless connections and combinations thereof.

In some embodiments, the user interface input devices 1012 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 1000. In some embodiments, the one or more user interface output devices 1014 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 1000. The one or more user interface output devices 1014 can be used, for example, to present user interfaces to facilitate user interaction with applications performing processes described and variations therein, when such interaction may be appropriate.

In some embodiments, the storage subsystem 1006 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 1006. These application modules or instructions can be executed by the one or more processors 1002. In various embodiments, the storage subsystem 1006 additionally provides a repository for storing data used in accordance with the present disclosure. In some embodiments, the storage subsystem 1006 comprises a memory subsystem 1008 and a file/disk storage subsystem 1010.

In embodiments, the memory subsystem 1008 includes a number of memories, such as a main random-access memory (RAM) 1018 for storage of instructions and data during program execution and/or a read only memory (ROM) 1020, in which fixed instructions can be stored. In some embodiments, the file/disk storage subsystem 1010 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 1000 includes at least one local clock 1024. The at least one local clock 1024, in some embodiments, is a counter that represents the number of ticks that have transpired from a particular starting date and, in some embodiments, is located integrally within the computing device 1000. In various embodiments, the at least one local clock 1024 is used to synchronize data transfers in the processors for the computing device 1000 and the subsystems included therein at specific clock pulses and can be used to coordinate synchronous operations between the computing device 1000 and other systems in a data center. In another embodiment, the local clock is a programmable interval timer.

The computing device 1000 could be of any of a variety of types, including a portable computer device, tablet computer, a workstation, or any other device described below. Additionally, the computing device 1000 can include another device that, in some embodiments, can be connected to the computing device 1000 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 1000 for processing. Due to the ever-changing nature of computers and networks, the description of the computing device 1000 depicted in FIG. 10 is intended only as a specific example for purposes of illustrating the preferred embodiment of the device. Many other configurations having more or fewer components than the system depicted in FIG. 10 are possible.

In some embodiments, data may be stored in a data store (not depicted). In some examples, a "data store" refers to any device or combination of devices capable of storing, accessing, and retrieving data, which may include any combination and number of data servers, databases, data storage devices, and data storage media, in any standard, distributed, virtual, or clustered system. A data store, in an embodiment, communicates with block-level and/or object level interfaces. The computing device 1000 may include any appropriate hardware, software, and firmware for integrating with a data store as needed to execute aspects of one or more applications for the computing device 1000 to handle some or all of the data access and business logic for the one or more applications. The data store, in an embodiment, includes several separate data tables, databases, data documents, dynamic data storage schemes, and/or other data storage mechanisms and media for storing data relating to a particular aspect of the present disclosure. In an embodiment, the computing device 1000 includes a variety of data stores and other memory and storage media as discussed above. These can reside in a variety of locations, such as on a storage medium local to (and/or resident in) one or more of the computers or remote from any or all of the computers across a network. In an embodiment, the information resides in a storage-area network (SAN) familiar to those skilled in the art, and, similarly, any necessary files for performing the functions attributed to the computers, servers or other network devices are stored locally and/or remotely, as appropriate.

In an embodiment, the computing device 1000 may provide access to content including, but not limited to, text, graphics, audio, video, and/or other content that is provided to a user in the form of HyperText Markup Language (HTML), Extensible Markup Language (XML), JavaScript, Cascading Style Sheets (CSS), JavaScript Object Notation (JSON), and/or another appropriate language. The computing device 1000 may provide the content in one or more forms including, but not limited to, forms that are perceptible to the user audibly, visually, and/or through other senses. The handling of requests and responses, as well as the delivery of content, in an embodiment, is handled by the computing device 1000 using PHP: Hypertext Preprocessor (PHP), Python, Ruby, Perl, Java, HTML, XML, JSON, and/or another appropriate language in this example. In an embodiment, operations described as being performed by a single device are performed collectively by multiple devices that form a distributed and/or virtual system.

In an embodiment, the computing device 1000 typically will include an operating system that provides executable program instructions for the general administration and operation of the computing device 1000 and includes a computer-readable storage medium (e.g., a hard disk, random access memory (RAM), read only memory (ROM), etc.) storing instructions that if executed (e.g., as a result of being executed) by a processor of the computing device 1000 cause or otherwise allow the computing device 1000 to perform its intended functions (e.g., the functions are performed as a result of one or more processors of the computing device 1000 executing instructions stored on a computer-readable storage medium).

In an embodiment, the computing device 1000 operates as a web server that runs one or more of a variety of server or mid-tier applications, including Hypertext Transfer Protocol (HTTP) servers, FTP servers, Common Gateway Interface (CGI) servers, data servers, Java servers, Apache servers, and business application servers. In an embodiment, computing device 1000 is also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python, or TCL, as well as combinations thereof. In an embodiment, the computing device 1000 is capable of storing, retrieving, and accessing structured or unstructured data. In an embodiment, computing device 1000 additionally or alternatively implements a database, such as one of those commercially available from Oracle®, Microsoft®, Sybase®, and IBM® as well as open-source servers such as MySQL, Postgres, SQLite, MongoDB.

In an embodiment, the database includes table-based servers, document-based servers, unstructured servers, relational servers, non-relational servers, or combinations of these and/or other database servers.

FIG. 11 is a block diagram illustrating driver and/or runtime software comprising one or more libraries to provide one or more application programming interfaces (APIs), in accordance with at least one embodiment. In at least one embodiment, the one or more APIs may be provided to a runtime enforcement system, as described herein, and implemented at a computing device, such as the computing device 1000 of FIG. 10. In at least one embodiment, a software program 1102 is a software module. In at least one embodiment, a software program 1102 comprises one or more software modules. In at least one embodiment, one or more APIs 1110 are sets of software instructions that, if executed, cause one or more processors to perform one or more computational operations. In at least one embodiment, one or more APIs 1110 are distributed or otherwise provided as a part of one or more libraries 1106 (which may be an example of the API library 205 of FIG. 2), runtimes 1104, drivers 1104, and/or any other grouping of software and/or executable code further described herein. In at least one embodiment, one or more APIs 1110 perform one or more computational operations in response to invocation by software programs 1102. In at least one embodiment, a software program 1102 is a collection of software code, commands, instructions, or other sequences of text to instruct a computing device to perform one or more computational operations and/or invoke one or more other sets of instructions, such as APIs 1110 or API functions 1112, to be executed. In at least one embodiment, functionality provided by one or more APIs 1110 includes software functions 1112. In at least one embodiment, a software program is a compiler.

In at least one embodiment, APIs 1110 are hardware interfaces to one or more circuits to perform one or more computational operations. In at least one embodiment, one or more software APIs 1110 described herein are implemented as one or more circuits to perform one or more techniques described above in conjunction with FIGS. 1-9. In at least one embodiment, one or more software programs 1102 comprise instructions that, if executed, cause one or more hardware devices and/or circuits to perform one or more techniques further described above in conjunction with FIGS. 1-9.

In at least one embodiment, software programs 1102, such as user-implemented software programs, utilize one or more application programming interfaces (APIs) 1110 to perform various computing operations, such as memory reservation, matrix multiplication, arithmetic operations, or any computing operation performed by parallel processing units (PPUs). In at least one embodiment, one or more APIs 1110 provide a set of callable functions 1112, referred to herein as APIs, API functions, and/or functions, that individually perform one or more computing operations. For example, in an embodiment, one or more APIs 1110 provide functions 1112 to cause resource management system 1116 to generate an access token to authorize a service provider to access resources of a user.

In at least one embodiment, an interface is software instructions that, if executed, provide access to one or more functions 1112 provided by one or more APIs 1110. In at least one embodiment, a software program 1102 uses a local interface when a software developer compiles the one or more software programs 1102 in conjunction with one or more libraries 1106 comprising or otherwise providing access to one or more APIs 1110. In at least one embodiment, one or more software programs 1102 are compiled statically in conjunction with pre-compiled libraries 1106 or uncompiled source code comprising instructions to perform one or more APIs 1110. In at least one embodiment, one or more software programs 1102 are compiled dynamically and the one or more software programs utilize a linker to link to one or more pre-compiled libraries 1106 comprising one or more APIs 1110.

In at least one embodiment, a software program 1102 uses a remote interface when a software developer executes a software program that utilizes or otherwise communicates with a library 1106 comprising one or more APIs 1110 over a network or other remote communication medium. In at least one embodiment, one or more libraries 1106 comprising one or more APIs 1110 are to be performed by a remote computing service, such as a computing resource services provider. In another embodiment, one or more libraries 1106 comprising one or more APIs 1110 are to be performed by any other computing host providing the one or more APIs 1110 to one or more software programs 1102.

In at least one embodiment, a processor performing or using one or more software programs 1102 calls, uses, performs, or otherwise implements one or more APIs 1110 to allocate and otherwise manage memory 1114 to be used by the software programs 1102. Those software programs 1102 request a resource management system 1116 receive and API call to obtain an access token, identify permissions, and generate the access token using functions 1112 provided, in an embodiment, by one or more APIs 1110.

In at least one embodiment, an API 1110 is provided by driver and/or runtime software 1104. In at least one embodiment, driver and/or runtime software 1104 is data values and software instructions that, if executed, perform or otherwise facilitate operation of one or more functions 1112 of an API 1110 during load and execution of one or more portions of a software program 1102. In at least one embodiment, a runtime 1104 is data values and software instructions that, if executed, perform, or otherwise facilitate operation of one or more functions 1112 of an API 1110 during execution of a software program 1102.

In at least one embodiment, one or more APIs 1110 provide combined arithmetic operations through driver and/or runtime software 1104, as described above. In at least one embodiment, one or more software programs 1102 utilize one or more APIs 1110 provided by driver and/or runtime software 1104 to allocate or otherwise reserve blocks of memory 1114. In at least one embodiment, one or more APIs 1110 are to perform combined arithmetic operations, as described below in conjunction with any of FIGS. 1-9.

To improve software programs 1102 usability and/or optimization of one or more portions of the software programs 1102, one or more APIs 1110 provide one or more API functions 1112 to perform a neural network usable or used by one or more computing devices as described above and further described below in conjunction with FIGS. 1, 2, and 6. In at least one embodiment, an exemplary block diagram

1100 depicts a processor, comprising one or more circuits to perform one or more software programs to combine two or more application programming interfaces (APIs) into a single API. In at least one embodiment, an exemplary block diagram 1100 depicts a system, comprising one or more processors to perform one or more software programs to combine two or more application programming interfaces (APIs) into a single API. In at least one embodiment, a processor uses an API to cause a resource management system 1116 to receive a request including a permission of a service provider to access resources of a user, identify a previous permission to access different resources, and, as a result, generate an access token that includes the previous permission and the permission. In at least one embodiment, an exemplary block diagram 1100 illustrates an API to invoke a resources management system to generate an access token to include multiple permissions.

FIG. 12 illustrates system 1200 for implementing rules by calling APIs, in accordance with at least one embodiment. In at least one embodiment, system 1200 may include natural language management service 1204, artificial intelligence model(s) 1206, and data structure management service 1208.

In various examples, unless explicitly expressed otherwise throughout the disclosure, terms such as "software" described herein may include one or more of operating systems, device drivers, application software, database software, graphics software, web browsers, development software (e.g., integrated development environments, code editors, compilers, interpreters), network software, simulation software, real-time operating systems (RTOS), artificial intelligence software, robotics software, firmware (e.g., BIOS/UEFI, router, smartphone, consumer electronics, embedded systems, printer, solid state drive (SSD)), APIs, containerized software, container orchestration platform, algorithms, instructions, and any other implementation embodied as a software package, code and/or instruction set.

Additionally, unless explicitly expressed otherwise throughout the disclosure, terms such as "hardware" described herein may include one or more of central processing units (CPU), integrated circuit (IC), system on-chip (SoC), graphics processing unit (GPU), data processing unit (DPU), digital signal processor (DSP), tensor processing unit (TPU), accelerated processing unit (APU), application-specific integrated circuits (ASIC), intelligent processing unit (IPU), neural processing unit (NPU), smart network interface controller (SmartNIC), vision processing unit (VPU), field-programmable gate array (FPGA) hardwired circuitry, programmable circuitry, state machine circuitry, fixed function circuitry, execution unit circuitry, and/or firmware that stores instructions executed by programmable circuitry.

In at least one embodiment, natural language management service 1204 may refer to one or more software and/or hardware components described herein to generate, modify, or otherwise manage natural language text corresponding to a plurality of entities. The natural language management service 1204 may use one or more artificial language models 1206 to read and process all of the natural language text stored within a distributed computing system. In some examples, the natural language management service 1204 may extract and distill conditions or terms expressed by the natural language text for inclusion in one or more artificial language models 1206. Metrics arising from implementing different conditions can be saved and periodically updated, and those metrics can be used to modify one or more portions of the natural language text. The natural language management service 1204 may determine or generate conditions and/or terms that cause those metrics to be improved and train one or more artificial language models 1206 to generate, modify, or identify those conditions and/or terms for particular entities. As a result, one or more artificial language models 1206 can be trained to provide real-time recommendations or predictions to the natural language management service 1204.

In some examples, natural language management service 1204 may store natural language text in a repository that includes a finalized version of the natural language text. In some examples, the natural language text can be machine-readable. Additionally, the natural language text may include annotations made by the natural language management service 1204 and/or one or more artificial language models 1206.

In other examples, natural language management service 1204 may provide a user interface to allow various computing devices to modify conditions, rules, terms, or any other portions of the natural language text. Modifications may include prioritizing certain portions of the natural language text and making exceptions for certain types of entities. The natural language text may include data visibility rules that are further described, for example, in conjunction with FIG. 13. In various examples, the natural language management service 1204 may provide an interface such that various entities can participate in the modification or generation of natural language text via their respective computing devices. The one or more artificial language models 1206 can participate in the process and provide recommendations for certain portions. The natural language management service 1204 may annotate a final version of the natural language text as "available for partner configuration" or "available for customer configuration" as part of partner/customer onboarding 1202. In some examples, natural language management service 1204 may include one or more components of input management subsystem 106 illustrated in FIG. 1 and/or input management subsystem 200 illustrated in FIG. 2 to perform one or more operations to identify and validate a set of rules, configurations, or conditions expressed by natural language text. Natural language management service 1204 may send the finalized version of the natural language text to data structure management service 1208.

In at least one embodiment, data structure management service 1208 refer to one or more software components and/or hardware components described herein to generate a data structure based on a set of rules, conditions, or other configurations that are to be implemented for a plurality of entities. The data structure management service 1208 may generate a context, key-value inclusion-exclusion matrix based on natural language text. To generate the matrix, the data structure management service 1208 may use information specific to a particular entity among the plurality of entities involved in the natural language text. The context may include partner/customer onboarding and account opening, partner processing rules, partner schedules, data visibility rules, enablement start and end dates, event occurrence limits, fraud risk appetite, geographical limits, among others. In some examples, the context can be mapped to application codes, APIs, among others. In some examples, data structure management service 1208 may send the matrix with context information to a data structure database (e.g., data structure DB 306 illustrated in FIG. 3) so that it can be accessible to the configuration management service 1302 to select or generate executable application code and/or APIs described herein. Additionally, portions of the matrix that correspond to 'Date Effective' can be used to generate test code and its associated APIs. The change of 'Date Effective' can trigger a change in application code and/or APIs, as performed by the configuration management service 1302 illustrated in FIG. 13.

In some examples, data structure management service 1208 may include one or more components of compute and storage engine 108 illustrated in FIG. 1 and/or compute and storage engine 300 illustrated in FIG. 3 to perform one or more operations to generate data structure based on a set of rules, configurations, or conditions.

FIG. 13 illustrates system 1300 for managing APIs to implement configurations indicated by natural language text during runtime of applications, in accordance with at least one embodiment. In at least one embodiment, system 1300 may include configuration management service 1302, metadata repository 1304, API repository 1306, runtime exception handler 1308, partner/customer processors and services 1310.

In at least one embodiment, configuration management service 1302 may refer to one or more software and hardware components described in conjunction with FIG. 12 to modify, generate, or otherwise manage APIs to implement a set of conditions expressed in natural language text. Configuration management service 1302 may generate application code needed to implement a set of conditions among a plurality of entities. In some examples, configuration management service 1302 may use one or more trained artificial intelligence models to generate application code. Configuration management service 1302 may analyze application code, including the ones that it generated, and may apply a contextual function taxonomy to the analyzed code elements.

In some examples, contextual function taxonomy may refer to a systematic classification framework in which the functional roles or operations of components, elements, or modules are categorized based on the specific context in which they are deployed or executed. This taxonomy may enable dynamic interpretation and assignment of functionality by recognizing that the same component may serve different purposes depending on environmental, situational, or system-level variables. By leveraging contextual cue, such as user behavior, system state, or external conditions, the taxonomy may support adaptive functionality, improving operational efficiency, modularity, and intelligent behavior within the system architecture.

In various examples, configuration management service 1302 may decompose application code and obtain metadata describing one or more operations performed on data structures or any other representations of the set of rules obtained from data management service 1208, illustrated in FIG. 12, or data structure DB 306, illustrated in FIG. 3. Configuration management service 1302 may access the metadata stored in metadata repository 1304. metadata repository 1304 may include any data to be used to generate one or more APIs, such as arguments, documentations, portions of API specifications, among others. In some examples, API specification may refer to a description of the structure, behavior, and expected interactions of API, defining how software components communicate with each other. API specifications may include available endpoints, request and response formats, authentication methods, error handling procedures, and data schemas. For example, an API specification may define a RESTful interface for retrieving user account information, including required HTTP methods, URL parameters, and response codes. An API specification may also specify security requirements such as token-based authentication or rate-limiting policies. Based on the data structure or any other representations, configuration management service 1302 may ensure that each portion of the data structure is mapped to code fragments. If no code fragments are found to be mapped to a certain portion of the data structure, configuration management service 1302 may flag that portion so that a code fragment can be generated for it. After determining that all portions of the data structure are mapped to code fragments, configuration management service 1302 can indicate that an application is ready for code generation.

As a result, configuration management service 1302 may generate code in the tech stack native to the calling application. In some examples, tech stacks may refer to the combination of software technologies, programming languages, frameworks, and tools used to develop and operate an application or system. Tech stack may include both client-side (frontend) and server-side (backend) components, as well as supporting infrastructure such as databases, APIs, and deployment platforms. The portions of the tech stocks can be selected to meet specific functional, performance, scalability, and maintainability requirements of the system being built or maintained. A tech stack may include React for the frontend, Node.js for the backend runtime, Express as a server framework, MongoDB for data persistence, and Docker for containerization. Alternatively, an enterprise system might use Angular, Java with Spring Boot, PostgreSQL, and Kubernetes. The composition of a tech stack can be selected based on development workflows, system architecture, and integration patterns. A tech stack may include tools such as OpenAPI (formerly Swagger) for defining API specifications, Postman for testing and validating API endpoints, and API gateways like Kong or Amazon API Gateway for managing traffic and enforcing security policies In some examples, configuration management service 1302 may also determine where to insert API calls to generate code, where the locations can be determined based on one or more portions of the data structure. Additional details regarding how insertion locations may be determined can be found in conjunction with FIG. 15 and its corresponding description below. Additionally, configuration management service 1302 may insert external or existing function calls instead of rewriting the base code. Configuration management service 1302 may determine if all sets of conditions are covered by the application code. Configuration management service 1302 may determine the dependencies between the APIs so that, for example, a second API can be called after the first API to implement a particular rule or condition.

In other examples, configuration management service 1302 may generate code to enforce valid values, contractual limits, etc., as defined in the data structure, and format it into a set of function calls (e.g., external) or a set of API calls. Configuration management service 1302 may determine the format (e.g., RESTful API, SOAP service call, COBOL subroutine, GraphQL, gRPC, JSON-RPC, XML-RPC, OData) of the function call or set of API calls based on the tech stack associated with the executable application. Additionally, for each enforcement function indicated by the data structure, configuration management service 1302 may generate a corresponding API.

In many examples, when changes to the data structure or a natural language text that express the set of conditions occur, configuration management service 1302 may set an effective date to trigger a new API generation to test and produce the API at the appropriate time in the release cycle. Additionally, any change in terms may cause configuration management service 1302 to generate a complete replacement API rather than editing the original API's base code. A new or modified API may trigger a change in the natural language text or any other records that were stored in association with the natural language text. As a result, configuration management service 1302 may cause APIs to implement contract terms proactively rather than allowing exceptions to happen in production. Also, configuration management service 1302 may allow the calling application to manage the exception in real-time. Configuration management service 1302 may ensure that interdependent applications are updated in sync to eliminate issues from failure to manage all related code.

In at least one embodiment, configuration management service 1302 may identify data elements using the data structures described herein to determine how they are changed as a result of implementing a set of conditions, rules, or any other configurations. It also identifies corresponding APIs that are used to generate, modify, or otherwise manage those data elements during the execution of one or more portions of one or more executable applications. In some examples, configuration management service 1302 may query metadata repository 1304 to obtain a mapping between data elements and corresponding code snippets or APIs. The APIs can be called to validate or check the data elements. In other examples, the APIs are called to determine whether the set of conditions, rules, or any other configurations are checked or validated and to send one or more responses based, at least in part, on the determination. In some examples, data elements can be different types of data that is handled by different API calls.

In at least one embodiment, configuration management service 1302 may store generated or modified APIs in API repository 1306, which can be exposed to an appropriate processor or system of partner/customer processors and services 1310 during the execution of one or more executable applications to implement a set of conditions expressed by natural language text.

In at least one embodiment, runtime exception handler 1308 may refer to one or more software and hardware components described in conjunction with FIG. 12, handling errors or any other exceptions that occur as part of executing application code and calling corresponding APIs to implement a set of conditions. In some examples, runtime exception handler 1308 may receive, for example, from applications executed by partner/customer processors and services 1310, exceptions detected during runtime. In response, runtime exception handler 1308 may identify appropriate error messages and may also list or point to valid values. Runtime exception handler 1308 may send (e.g., via an API call) the error message, valid value list or location, and optional corrective action guidance. The application being performed may receive the error message, valid value list or location, and optional corrective action guidance and respond in its native tech stack. Runtime exception handler 1308 may log the exceptions detected. As a result, runtime exception handler 1308 may flexibly handle errors.

Additionally, runtime exception handler 1308 may generate data visibility rule codes that specify which users or systems are allowed to view specific pieces of data and under what circumstances. Data visibility rules can be implemented via one or more API calls, where managed fields are initially configured by default as 'excluded,' meaning access is prevented, without explicit permission. Some portions (e.g., managed fields) are already mapped to corresponding APIs. In some examples, calling one or more APIs can control how specific fields can be accessed and modified, especially when some fields contain sensitive and critical data that requires protection. Additionally, the limitation can extend its uses in a program that displays the data and the programs that manipulate it.

In at least one embodiment, partner/customer processors and services 1310 may refer to one or more software and hardware components described in conjunction with FIG. 12, executing application code to call one or more APIs in real-time and/or runtime to implement a set of conditions expressed in natural language text. Partner/customer processors and services 1310 may call one or more APIs based on a set of rules and computer-detected events that trigger the implementation of these rules. For example, a detected threat or fraud can be reported to partner/customer processors and services 1310, allowing a corresponding set of rules to be implemented by calling one or more APIs. A threat may refer to any potential event, condition, or actor that could cause unauthorized access, disruption, misuse, or loss of digital systems, data, services, or any other property. Such threats may include malware attacks that exploit software vulnerabilities, unauthorized access by internal or external users, misconfigurations that expose sensitive data, or denial-of-service events that impair system availability. Once the event is resolved, additional APIs can be called by the partner/customer processors and services 1310 to ensure that the set of rules are no longer applicable.

In at least one embodiment, configuration management service 1302 may communicate with at least one of the partner/customer processors and services 1310 to add one or more entities to a distributed computing system, allowing one or more sets of conditions to be implemented among entities. Partner/customer processors and services 1310 may perform applications to submit one or more API calls to implement some sets of conditions while the entities are being added. Runtime exception handler 1308 can handle exceptions during the process. As the entities are added, necessary information (e.g., account records or any other natural language text) can be stored as a result. Additionally, natural language text can be updated after the entities have been added. In some examples, configuration management service 1302 may include one or more components of runtime platform management subsystem 110 illustrated in FIG. 1 and/or runtime platform management 400 illustrated in FIG. 4 to generate and provide executable applications described herein. As a result of calling the APIs, partner/customer processors and services 1310 can determine whether the set of conditions applicable to one or more exchanges or operations performed between different entities has been implemented and if further action is needed. For example, additional sets of conditions may need to be implemented due to compliance or non-compliance. Additionally, partner/customer processors and services 1310 can perform one or more operations based on the determination of compliance or non-compliance.

In at least one embodiment, configuration management service 1302 may generate and exposes multiple APIs dynamically, each configured to serve specific combinations of entities such as users, applications, services, or external systems. Configuration management service 1302 may allow new endpoints to be created automatically based on the relationships and data structures defined at runtime. As more combinations of entities and integration scenarios are introduced, the configuration management service 1302 may be able to accommodate them without requiring significant changes to the core codebase or architecture.

Figure 14:
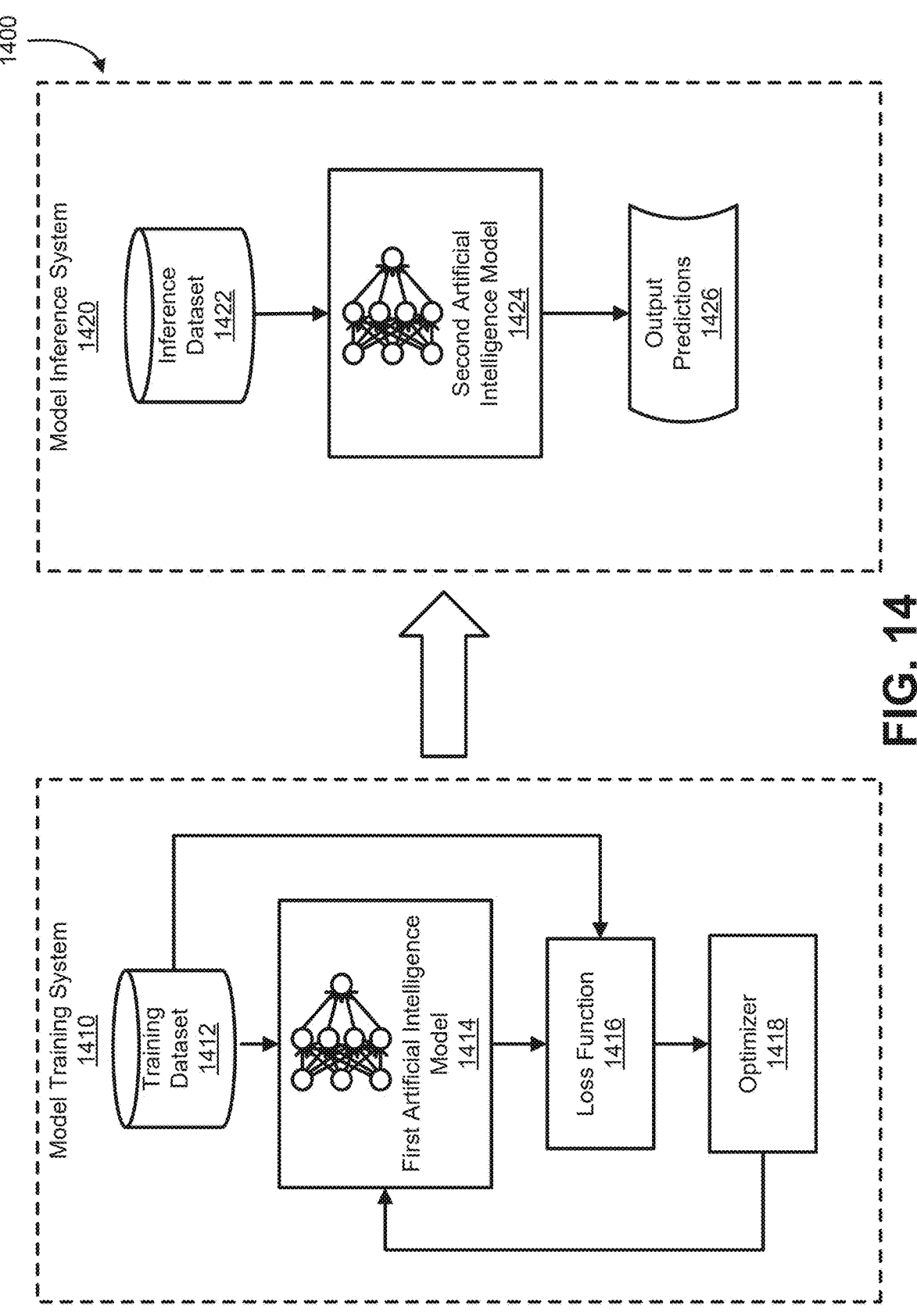
FIG. 14 illustrates an example of a system to train and use artificial intelligence models, in accordance with an embodiment.

FIG. 14 illustrates system 1400 to train and use artificial intelligence models described herein, in accordance with at least one embodiment. System 1400 may include a distributed system, which may refer to a network of independent computers that coordinate to achieve common functionality (e.g., artificial intelligence model training, artificial intelligence model inferencing). System 1400 may include nodes connected via communication protocols, data distribution methods, and synchronization mechanisms. The nodes may execute processes concurrently across different machines, exchanging messages and replicating data. System 1400 may perform load balancing and fault detection operate to manage resources and ensure system reliability. Alternatively, system 1400 may include a single computer or a server that manages and controls all operations.

In at least one embodiment, system 1400 may include model training system 1410 and model inference system 1420. Model training system 1410 may refer to one or more of software and hardware described in conjunction with FIG. 12 to train one or more machine learning models described herein. Model training system 1410 may include frameworks such as TensorFlow, PyTorch, Keras, MXNet, Caffe, Theano, etc. Model training system 1410 may include using one or more hardware accelerators described herein (e.g., GPUs) to accelerator one or more portions to train one or more artificial intelligence models such as, first artificial intelligence model 1414. First artificial intelligence model 1414 may include the one or more artificial intelligence models described herein.

An artificial intelligence model may refer to a computational system trained on data to recognize patterns, make decisions, or perform tasks that typically require human intelligence. An artificial intelligence model may include, for example, machine learning models, neural networks, deep learning architectures, decision trees, support vector machines, and natural language processing models. In some examples, neural networks may include, for example, may include, for example, feedforward neural networks, convolutional neural networks (CNNs), recurrent neural networks (RNNs), long short-term memory networks (LSTMs), gated recurrent units (GRUs), transformer networks, generative adversarial networks (GANs), autoencoders, variational autoencoders (VAEs), radial basis function networks (RBFNs), modular neural networks, spiking neural networks (SNNs), graph neural networks (GNNs), deep belief networks (DBNs), capsule networks, self-organizing maps (SOMs), extreme learning machines (ELMs), neuro-fuzzy networks, Bayesian neural networks (BNNs), liquid state machines, and echo state networks (ESNs).

In at least one embodiment, model training system 1410 may normalize and transform input data, such as training dataset 1412. Model training system 1410 may perform data normalization processes that scale feature values to a standard range, such as min-max scaling or z-score normalization. Model training system 1410 may generate additional training samples to be added to training dataset 1412 through transformations like rotation, flipping, or cropping. Model training system 1410 may perform feature extraction operations, extracting relevant attributes from raw data, and feature selection, identifying the most significant features for first artificial intelligence model 1414. Model training system 1410 may remove noise, address missing values, perform data cleaning tasks for training dataset 1412.

In at least one embodiment, model training system 1410 define the layers and connections of first artificial intelligence model 1414. Model training system 1410 may determine the type of each layer, such as convolutional, recurrent, or fully connected layers, and set parameters like the number of neurons or filters. Model training system 1410 may assign specific activation functions, such as ReLU or sigmoid, to each layer to introduce non-linearity. Model training system 1410 may establishes connection patterns by configuring how layers interact, including sequential arrangements, skip connections, or branching paths. Model training system 1410 may define inputs and output layers to ensure appropriate data flow through first artificial intelligence model 1414. Model training system 1410 initialize weights and biases for each connection, setting initial values that influence the training process. In some examples, initializing of weights and biases may include (1) Zero Initialization, which sets all weights to zero; (2) random Initialization, where weights are set to small random values; (3) Glorot Initialization that adjusts the scale of the weights according to the number of input and output neurons; and (4) He Initialization that sets weights with a variance scaled by the number of input neurons.

In at least one embodiment, first artificial intelligence model 1414 may include an untrained artificial intelligence model, which may refer to an artificial intelligence model architecture that has been initialized but not yet exposed to any training data. In various examples, first artificial intelligence model 1414 may include pre-trained artificial intelligence models, such as VGG, ResNet, GoogleNet, EfficientNEt, YOLO, BERT, GPT, T5, RoBERTa, XLNet, DeepSpeech, Wav2Vec, Jasper, AlphaZero, StyleGAN, etc. In other examples, first artificial intelligence model 1414 may include second artificial intelligence model 1424 that is already trained.

In at least one embodiment, training dataset 1412 may refer to a collection of labeled or unlabeled data used to train first artificial intelligence model 1414. Training dataset 1412 may include input samples, which represent the features or attributes that the artificial intelligence model processes, and corresponding target outputs, which first artificial intelligence model 1414 aims to predict. Training dataset 1412 may include batches or mini-batches. Training dataset 1412 may include various data formats, such as images, text, or numerical data, by structuring the data in formats compatible with the input layer of first artificial intelligence model 1414. Additionally, training dataset 1412 may include metadata that provides information about the data sources, labeling schemes, and any preprocessing steps applied, as noted above. In some examples, there can be one or more artificial intelligence models (separate from artificial intelligence models 1414) that generates training dataset 1412. For example, the one or more artificial intelligence learning models may include Generative Adversarial Networks (GANs) or Variational Autoencoders (VAEs) that mimic the characteristics of a genuine dataset. In other examples, one or more teacher artificial intelligence models can generate predicted labels, intermediate feature representations, or synthetic samples to encapsulate learned patterns of the one or more artificial intelligence models. The generated information can be part of training dataset 1412, which is used to train the first artificial intelligence model 1414, transforming it into a student artificial intelligence model.

In at least one embodiment, training dataset 1412 can include various types of natural language text (e.g., contracts) that express a set of conditions, rules, constraints, configurations, among others, to be implemented between a set of entities to train the first artificial intelligence model 1414. This can allow the second artificial intelligence model 1424 to be used to generate, update, or otherwise manage one or more portions of the natural language text. The training dataset 1412 can comprise pairs of suggestions and corresponding portions of natural language text so that the second artificial intelligence model 1424 can be trained to provide suggestions to generate or update the natural language text. In addition, the training dataset 1412 can comprise a set of conditions and corresponding portions of natural language text so that the second artificial intelligence model 1424 can be trained to identify portions of natural language text that express those sets of conditions.

In at least one embodiment, training dataset 1412 can include various types of data structures (e.g., matricies, vectors) or any other representations that correspond to the set of conditions, programming objectives and application code such that second artificial intelligence model 1424 can be trained to generate application code based, at least in part, on the set of conditions. Additionally, training dataset 1412 may include various types of API endpoints, API handlers, API documentation, API specification, corresponding application code and/or data structures or any other representations that correspond to the set of conditions such that second artificial intelligence model 1424 can be trained to generate API endpoints, API handlers, API documentation, API specification using application code, data structures, and/or set of conditions. In some examples, other artificial intelligence models can be used to generate those (e.g., application code, representations, set of conditions, APIs) that can become part of training dataset 1412 those can be used for model distillation.

In some examples, training dataset 1412 can further include various metrics arising from performing one or more operations regarding each of the plurality of entities and its corresponding sets of rules, conditions, or configurations expressed by the natural language text. This allows the second artificial intelligence model 1424 to be trained to determine which sets of rules, conditions, or configurations need to be expressed in the finalized natural language text that corresponds to at least two of the plurality of entities. Additionally, in some examples, the training dataset 1412 can further include features of each individual entity and mapping with the metrics for the second artificial intelligence model 1424 to make a decision on whether to add an entity to the distributed computing system.

In at least one embodiment, model training system 1410 performs forward pass using training dataset 1412. The forward pass may refer to a process where input data from training dataset 1412 propagates through first artificial intelligence model 1414 to generate output predictions. The forward pass may include feeding input samples into the input layer of first artificial intelligence model 1414, sequentially passing data through each hidden layer of first artificial intelligence model 1414 by applying the defined activation functions, and producing outputs in the output layer of first artificial intelligence model 1414. Model training system 1410 may process each layer's computations by performing matrix multiplications with weights, adding biases, and applying activation functions to introduce non-linearity.

In at least one embodiment, model training system 1410 uses loss function 1416 to evaluate discrepancy between the output predictions and actual target values from training dataset 1412 generated during the forward pass. Loss function 1416 may include mechanisms for calculating the difference using specific mathematical formulations, such as mean squared error for regression tasks or cross-entropy loss for classification tasks. Loss function 1416 can include aggregations of individual errors across the training samples to produce a single scalar value representing the overall performance of first artificial intelligence model 1414.

In at least one embodiment, optimizer 1418 may refer to a computational component that adjusts weights and biases of first artificial intelligence model 1414 to minimize loss function 1416. Optimizer 1418 may include algorithms such as stochastic gradient descent (SGD), Adam, and RMSprop, each implementing specific strategies for updating parameters based on calculated gradients. Optimizer 1418 may calculate gradients of loss function 1416 with respect to each parameter by applying backpropagation, determining the direction and magnitude of adjustments needed. Optimizer 1418 may manage learning rates, which control the step size of each update, and may incorporate techniques like momentum to accelerate convergence by considering past gradient information. Optimizer 1418 may perform adaptive learning rate adjustments and allow different parameters to be updated at varying rates based on their individual gradient histories. Optimizer 1418 may execute iterative update rules during each training epoch, systematically refining parameters of first artificial intelligence model 1414 to progressively reduce the loss and improve the performance of first artificial intelligence model 1414 on training dataset 1412.

In at least one embodiment, model training system 1410 may perform training in a supervised, partially supervised, or unsupervised manner. Model training system 1410 may perform federated learning, where multiple decentralized devices or servers collaboratively train first artificial intelligence model 1414 while keeping the training data (e.g., portions of training dataset 1412) localized. In some examples, model training system 1410 can perform model or knowledge distillation.

In at least one embodiment, model training system 1410 may perform fine tuning of first artificial intelligence model 1414. Fine tuning may refer to performing additional training on a new, often more specific dataset to adapt its parameters for a particular task. Fine tuning may include loading the pre-trained weights and biases into the architecture of first artificial intelligence model 1414, selecting specific layers of first artificial intelligence model 1414 to update while freezing others to retain previously learned features. Fine tuning may include reinitializing certain layers of first artificial intelligence model 1414 if necessary and applying regularization techniques to prevent overfitting during the subsequent training phases. Fine tuning may include configuring a lower learning rate to make subtle adjustments to the parameters first artificial intelligence model 1414 of to ensure that the existing knowledge is preserved while accommodating new information.

In at least one embodiment, model training system 1410 may perform the iterative process until first artificial intelligence model 1414 achieves a desired accuracy. For example, model training system 1410 may evaluate first artificial intelligence model 1414 using a test or validation set and the accuracy can be the ratio of correctly predicted labels. In some examples, accuracy of first artificial intelligence model 1414 may depend on the final loss on the test or validation set. After determining that the desired accuracy is met, first artificial intelligence model 1414 becomes second artificial intelligence model 1424. In some examples, second artificial intelligence model 1424 may refer to various artificial intelligence models, artificial intelligence models, neural networks described herein.

In at least one embodiment, model inference system 1420 may refer to a framework that executes trained artificial intelligence models, such as second artificial intelligence model 1424 to generate output predictions 1426 based on new input data, such as inference dataset 1422. Model inference system 1420 may load and initialize parameters (e.g., weights, biases) of second artificial intelligence model

1424 into the runtime environment. Model inference system 1420 feeds inference dataset 1422 to input layer of second artificial intelligence model 1424, where values are generated and propagated through one or more layers of second artificial intelligence model 1424 and output predictions 1426 are generated. In some examples, inference dataset 1422 may include images, videos, text, audio, etc. inference dataset 1422 may include synthetic data generated by artificial intelligence models (e.g., GAN) other than second artificial intelligence model 1424.

In at least one embodiment, model inference system 1420 may include cloud servers or edge devices to deploy second artificial intelligence model 1424. Model inference system 1420 may include cores, devices, inference chips, GPUs to generate activations to further generate output predictions 1426. Output predictions 1426 may include classification labels, probability distributions, continuous numerical values, sequences, images, translations, embeddings, actions, structured data outputs, audio, heatmaps, attention maps, generative content, etc.

FIG. 15 illustrates process 1500 for managing application programming interfaces (APIs) to enforce configurations indicated by natural language during runtime of applications. Some or all of the process 1500 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 1500 may be performed by any suitable system (e.g., runtime enforcement system 102, input management subsystem 106, compute and storage engine 108, runtime platform management subsystem 110 illustrated in FIG. 1, configuration input UX 202, validation UX 204, API library 205, configuration management service 208, configuration DB 210 illustrated in FIG. 2, event management service 302, data structure generator 304, data structure DB 306 illustrated in FIG. 3, pre-output generator 402, application context injector 404, application 408, application services 410, application output generator 412 illustrated in FIG. 5, computing device 1000 illustrated in FIG. 10, software program 1102, API(s) 1110, natural language management service 1204, artificial intelligence model(s) 1206, data structure management service 1208 illustrated in FIG. 12, configuration management service 1302, metadata repository 1304, API repository 1306, runtime exception handler 1308, partner/customer processors and services 1310 illustrated in FIG. 13, model training system 1410, first artificial intelligence model 1414, model inference system 1420, second artificial intelligence model 1424 illustrated in FIG. 14). In some examples, some or all of process 1500 can be performed by artificial intelligence models described herein.

At block 1502, process 1500 may include identifying a set of rules, conditions, or any other configurations to be implemented among a plurality of entities, in accordance with an embodiment. At block 1504, process 1500 may further include identifying or generating portions of application that corresponds to the set of rules, in accordance with an embodiment.

At block 1506, process 1500 may further include identifying or generating APIs to be called during the runtime of the application to implement the set of rules, in accordance with an embodiment. In some examples, the identification or generation of APIs can be based on existing application code that has been previously stored or generated in response to an updated portion of the set of rules. In one embodiment, there is a central database that stores all the sets of rules and corresponding APIs already generated, so they can be inserted into an executable application.

At block 1508, process 1500 may further include determining locations (e.g., insertable locations) within the application where the APIs are going to be inserted, in accordance with an embodiment. The insertion locations can be based on metadata inferred or extracted from the set of conditions. In some examples, some of the locations are already stored in a database, and systems or services may retrieve those locations. In other examples, there are application code snippets used to determine where to insert the API. In various examples, code structure, configurations, design patterns, etc., are used to determine the locations. What APIs to insert or where in the application code to insert the APIs may depend on the entities associated with the set of rules. The insertion locations may correspond to interdependencies between different APIs that need to be called to implement a particular API or multiple APIs that these different APIs correspond to.

At block 1510, process 1500 may further include exposing the APIs to implement the set of rules during runtime of the application, in accordance with an embodiment. As a result of exposing the API, different processors configured to handle various tasks may execute one or more portions of the software code to call one or more of the set of APIs for those tasks, as different rules from the set of rules are applicable to different tasks.

Note that one or more of the operations performed in blocks 1502-1510 may be performed in various orders and combinations, including in parallel. Some or all of the process 1500 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media).

FIG. 16 illustrates process 1600 for managing APIs to implement configurations indicated by natural language text during runtime of applications, in accordance with at least one embodiment. Some or all of the process 1600 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 1500 may be performed by any suitable system (e.g., runtime enforcement system 102, input management subsystem 106, compute and storage engine 108, runtime platform management subsystem 110 illustrated in FIG. 1, configuration input UX 202, validation UX 204, API library 205, configuration management service 208, configuration DB 210 illustrated in FIG. 2, event management service 302, data structure generator 304, data structure DB 306 illustrated in FIG. 3, pre-output generator

402, application context injector 404, application 408, application services 410, application output generator 412 illustrated in FIG. 5, computing device 1000 illustrated in FIG. 10, software program 1102, API(s) 1110, natural language management service 1204, artificial intelligence model(s) 1206, data structure management service 1208, configuration management service 1302, metadata repository 1304, API repository 1306, runtime exception handler 1308, partner/customer processors and services 1310 illustrated in FIG. 13, model training system 1410, first artificial intelligence model 1414, model inference system 1420, second artificial intelligence model 1424 illustrated in FIG. 14). In some examples, some or all of process 1600 can be performed by artificial intelligence models described herein.

At block 1602, process 1600 may include using first trained artificial intelligence models to modify natural language text, in accordance with one embodiment. The first trained artificial intelligence models are trained based on various natural language texts that correspond to a combination of various entities involved. These models are further trained based on certain metrics measured as a result of implementing some of the rules, configurations, or conditions. For example, language that results in better metrics is likely to be preferred for inclusion in the natural language text. As a result, the first trained artificial intelligence models modify the natural language text to improve some metrics (e.g., higher performance, fewer errors, etc.) when the set of rules is implemented. In some examples, modifying the text results in changing the rules that the natural language text is to express. Additionally, first trained artificial intelligence models can generate/update new rules, conditions, or configurations.

At block 1604, process 1600 may further include using second trained artificial intelligence models to identify the set of rules expressed by the natural language text, in accordance with one embodiment. In some examples, the second trained artificial intelligence models may include first trained artificial intelligence models. At block 1606, process 1600 may further include converting portion of the natural language text that corresponds to the set of rules to a data structure, in accordance with one embodiment. Different data structures are described herein, especially in conjunction with FIG. 3.

At block 1608, process 1600 may further include using a third trained artificial intelligence model to generate application code to perform operations with respect to a plurality of entities based on the data structure, in accordance with one embodiment. At block 1610, process 1600 may further include generating information based on the application code to generate or select APIs to be called during runtime of the application code, in accordance with one embodiment. In some examples, various libraries are queried to select or modify existing APIs within the database that correspond to at least one of the set of rules. For example, the data structure may include a plurality of data elements that are to be modified during the implementation of the set of rules, and systems may identify APIs that generate, modify, or otherwise manage those data elements.

Note that one or more of the operations performed in blocks 1602-1610 may be performed in various orders and combinations, including in parallel. Some or all of the process 1500 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media).

As a result of API generation using executable application code, data structures, configurations (e.g., rules, conditions), and natural language text, several advantages are directed towards computer technology. Enhanced interoperability can be achieved as APIs facilitate seamless communication between different software systems within the distributed computing system, allowing them to work together more efficiently. This leads to increased automation, reducing manual coding efforts and minimizing human error, thereby speeding up development cycles. Scalability can be another benefit, as automatically generated APIs can easily accommodate growing entities within the distributed computing system, ensuring applications remain responsive. The flexibility and adaptability of APIs can allow applications to be modified or extended to incorporate new features or integrate with other systems or follow up with new natural language text generated between existing or new entities. Improved data management can be facilitated through structured data exchange, making it easier to manage and analyze data across platforms.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Implementations may include one or more of the following features. The system may include one or more processors and memory including computer-executable instructions that, as a result of execution by the one or more processors, cause the system to obtain a document that includes natural language text. The instructions may further cause the system to extract, from the document using a machine learning model trained on other natural language text, a set of conditions expressed by the natural language text of the document; cause a validation process to be performed against the set of conditions extracted from the document to result in a validated set of conditions; and upon successful validation, generate a machine-readable data structure to indicate one or more conditions of the validated set of conditions expressed within the document, the machine-readable data structure being usable to evaluate the validated set of conditions against computer-detected events. The computer-executable instructions that cause the system to extract of the set of conditions may further cause the system to use the machine learning model after the machine learning model is trained to identify the set of conditions using historical documents, where the machine learning model may include one or more language models. The computer-executable instructions that cause the system to extract the set of conditions may further cause the system to use the machine learning model in combination with one or more of retrieval-augmented generation (RAG) or prompt engineering. The computer-executable instructions that cause the system to cause the validation process to be performed may further cause the system to validate compliance of the set of conditions with sets of conditions of the other natural language text on which the machine learning model was trained. The computer-executable instructions that cause the system to cause the validation process to be performed may further cause the system to store the validated set of conditions at a database accessible to an engine may include further computer-executable instructions to transform the validated set of conditions into the machine-readable data structure. The computer-executable instructions that cause the system to generate the machine-readable data structure may further cause the validation process to be performed independent of occurrence of the computer-detected events.

In at least one embodiment, a computer-implemented method may include obtaining a document that includes natural language text. The computer-implemented method may include extracting, from the document using a machine learning model trained on other natural language text, a set of conditions expressed by the natural language text of the document. The computer-implemented method may include causing a validation process to be performed against the set of conditions extracted from the document to result in a validated set of conditions. The computer-implemented method may include, as a result of successful validation, generating a machine-readable data structure to indicate one or more conditions of the validated set of conditions expressed within the document, the machine-readable data structure being usable to evaluate the validated set of conditions against computer-detected events. The computer-implemented method may include extracting the set of conditions from the document and receiving the document at a second user experience implemented at a computing device to use the machine learning model to identify the set of conditions of the document. The computer-implemented method may further include receiving information in addition to the document at a second user experience implemented at a computing device. The information may include one or more of historical transactions, historical events, or consumer-specific data. The computer-implemented method may include calling one or more APIs to cause the validation process to be performed. The computer-implemented method may include storing the validated set of conditions, expressed as natural language text at a database managed by a management service monitoring storage, modification, and retrieval of sets of conditions at the database. The computer-implemented method may include storing the validated set of conditions at a database accessible to an engine may include computer-executable instructions to retrieve a stored set of conditions from the database and generate the machine-readable data structure using the stored set of conditions.

In at least one embodiment, a non-transitory computer-readable storage medium may store computer-executable instructions that, as a result of being executed by one or more processors of a computer system, may cause the computer system to at least obtain a document that includes natural language text. The computer-executable instructions may further cause the computer system to extract, from the document using a machine learning model trained on other natural language text, a set of conditions expressed by the natural language text of the document. The computer-executable instructions may further cause a validation process to be performed against the set of conditions extracted from the document to result in a validated set of conditions. The computer-executable instructions may further cause, as a result of successful validation, the computer system to generate a machine-readable data structure to indicate one or more conditions of the validated set of conditions expressed within the document, the machine-readable data structure being usable to evaluate the validated set of conditions against computer-detected events.

The computer-executable instructions that cause the computer system to extract the set of conditions may further cause the computer system to use a small language model (SLM) to extract the set of conditions. The computer-executable instructions that cause the computer system to cause the validation process to be performed may further cause the computer system to use the machine learning model to confirm compliance of the set of conditions to prior set of conditions established between two or more entities common to the set of conditions and the prior set of conditions. The computer-executable instructions may include executable instructions that cause the computer system to detect the computer-detected events based, at least in part, on an indication for a request for a service provided by one or more of two or more entities having an agreement defined, at least in part, by the validated set of conditions. The computer-executable instructions include executable instructions that may cause the computer system to, in addition to the machine-readable data structure, use contextual information regarding characteristics of the computer-detected events to evaluate the validated set of conditions against the computer-detected events.

Implementations of the described techniques may include hardware, a method or process, or computer software on a computer-accessible medium.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method for dynamically generating a set of application programming interfaces (APIs) usable to implement a set of conditions applicable to an exchange to be performed among a plurality of entities, the computer-implemented method comprising:
   receiving an indication to generate the set of APIs;
   receiving, in response to the indication, metadata corresponding to the set of conditions;
   generating the set of APIs based, at least in part, on the metadata;

analyzing executable application code to determine one or more insertion points for the set of APIs to be called, the executable application code to be executed during performance of the exchange; and inserting the set of APIs into the executable application code using the one or more insertion points to cause the set of conditions to be implemented in real time as a result of calling the set of APIs.

2. The computer-implemented method of claim 1, further comprising:

obtaining natural language text modified by at least using one or more trained artificial intelligence models; and identifying portions of natural language text that expresses the set of conditions.

3. The computer-implemented method of claim 1, further comprising:

generating a machine-readable data structure that corresponds to the set of conditions, wherein the machine-readable data structure is usable to generate the set of APIs.

4. The computer-implemented method of claim 1, wherein at least one of the executable application code is generated using one or more trained artificial intelligence models based, at least in part, on one or more matrices that correspond to the set of conditions.

5. A system, comprising:

one or more processors; and one or more non-transitory, computer-readable media comprising executable instructions recorded thereon that, as a result of execution by the one or more processors, cause the system to at least:

obtain metadata corresponding to a set of conditions applicable to an exchange to be performed among a plurality of entities, the set of conditions determined using one or more trained artificial intelligence models;

generate a set of application programming interfaces (APIs) based, at least in part, on the set of conditions;

determine one or more points to insert the set of APIs to an executable application code to be executed for the exchange; and cause the set of APIs to be called during runtime of the executable application code to implement the set of conditions.

6. The system of claim 5, wherein the executable instructions further include instructions that further cause the system to:

generate, using one or more additional trained artificial intelligence models, a portion of the executable application code based, at least in part, on the set of conditions.

7. The system of claim 5, wherein the executable instructions further include instructions that further cause the system to:

update an API specification corresponding to the set of APIs as a result of obtaining an indication that the set of conditions has been changed.

8. The system of claim 5, wherein the executable instructions further include instructions that further cause the system to:

obtain context information corresponding to at least one of the plurality of entities; and generate machine-readable data structure based, at least in part, on the set of conditions and the context information, wherein the machine-readable data structure is usable to generate the set of APIs.

9. The system of claim 8, wherein the machine-readable data structure is generated by at least converting the set of conditions and the context information into one or more matrices.

10. The system of claim 8, wherein the one or more points to insert the set of APIs and one or more arguments for the set of APIs are determined based, at least in part, on the machine-readable data structure.

11. The system of claim 5, wherein the executable instructions further include instructions that further cause the system to:

update the one or more trained artificial intelligence models based, at least in part, on natural language text.

12. The system of claim 5, wherein the executable instructions further include instructions that further cause the system to:

determine a format for the set of APIs based, at least in part, on a tech stack that corresponds to the executable application code.

13. The computer-implemented method of claim 1, wherein the one or more insertion points is determined based, at least in part, on the metadata.

14. One or more non-transitory computer-readable storage media having stored thereon computer-executable instructions that, as a result of being executed by one or more processors of a computer system, cause the computer system to at least:

obtain metadata corresponding to a set of conditions applicable to an exchange to be performed among a plurality of entities, the set of conditions determined using one or more trained artificial intelligence models;

generate a set of application programming interfaces (APIs) based, at least in part, on the set of conditions;

analyze executable application code to be executed during performance of the exchange to determine one or more locations for the set of APIs to be embedded into the executable application code; and cause the set of APIs to implement the set of conditions for the exchange during execution of the executable application code.

15. The one or more non-transitory computer-readable storage media of claim 14, wherein calling the set of APIs to implement the set of conditions causes an additional set of conditions to control the exchange, the additional set of conditions corresponding to an additional set of APIs.

16. The one or more non-transitory computer-readable storage media of claim 14, wherein the computer-executable instructions further include executable instructions that further cause the computer system to:

generate, using one or more additional trained artificial intelligence models, a portion of the executable application code based, at least in part, on the set of conditions.

17. The one or more non-transitory computer-readable storage media of claim 14, wherein the computer-executable instructions further include executable instructions that further cause the computer system to:

generate machine-readable data structure based, at least in part, on the set of conditions and context information that corresponds to at least one of the plurality of entities.

18. The one or more non-transitory computer-readable storage media of claim 17, wherein the computer-executable instructions further include executable instructions that further cause the computer system to:

determine a set of functions to be performed as a result of calling the set of APIs based, at least in part, on the machine-readable data structure.

19. The one or more non-transitory computer-readable storage media of claim 17, wherein the one or more locations for the set of APIs to be embedded is determined based, at least in part, on the machine-readable data structure.

20. The one or more non-transitory computer-readable storage media of claim 14, wherein the computer-executable instructions further include executable instructions that further cause the computer system to:

determine dependencies between a first API and a second API of the set of APIs to cause a second API to be called as a result of calling the first API.

\* \* \* \* \*